(12) United States Patent
Liu et al.

(10) Patent No.: US 10,698,423 B2
(45) Date of Patent: Jun. 30, 2020

(54) SYSTEMS AND METHODS FOR SURVEILLANCE WITH A VISUAL MARKER

(71) Applicant: SZ DJI TECHNOLOGY CO., LTD., Shenzhen (CN)

(72) Inventors: Ang Liu, Shenzhen (CN); Xiao Hu, Shenzhen (CN); Guyue Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/373,849

(22) Filed: Apr. 3, 2019

(65) Prior Publication Data

US 2019/0235531 A1 Aug. 1, 2019

Related U.S. Application Data

(63) Continuation of application No. 15/289,384, filed on Oct. 10, 2016, which is a continuation of application No. PCT/CN2014/090078, filed on Oct. 31, 2014.

(51) Int. Cl.
*G05D 1/10* (2006.01)
*B64C 39/02* (2006.01)
(Continued)

(52) U.S. Cl.
CPC ........... *G05D 1/102* (2013.01); *B64C 39/024* (2013.01); *B64D 47/08* (2013.01); *G01C 21/206* (2013.01);
(Continued)

(58) Field of Classification Search
USPC ............................................................ 701/3
See application file for complete search history.

(56) References Cited

U.S. PATENT DOCUMENTS

| 4,566,032 A | 1/1986 | Hirooka et al. |
| 5,041,722 A | 8/1991 | Suzuki et al. |

(Continued)

FOREIGN PATENT DOCUMENTS

| CN | 1916801 A | 2/2007 |
| CN | 101244765 A | 8/2008 |

(Continued)

OTHER PUBLICATIONS

Gui and Lei et al., Airborne Vision-Based Navigation Method for UAV Accuracy Landing Using Infrared Lamps, J Intell Robot Syst (2013) 72:197-218 DO110.1007/si 0846-013-9819-5 (Mar. 15, 2013) Springer Science Business Media Dordrecht 2013 (https://link.springer.com/content/pdf/10.1007%2Fs10846-013-9819-5.pdf) (her.*
(Continued)

*Primary Examiner* — Jean Paul Cass
(74) *Attorney, Agent, or Firm* — Anova Law Group, PLLC

(57) ABSTRACT

A method of controlling an unmanned aerial vehicle (UAV) includes receiving an image from one or more vision sensors of the UAV. The image is captured while the UAV is in flight and includes a marker within an environment. The marker has a visual pattern. The method further includes identifying the visual pattern to determine a plurality of instructions encoded in the visual pattern, and controlling, in response to the plurality of instructions, the UAV to perform an action including at least one of adjusting position of a payload, swapping a payload, or capturing an image of a selected subject.

20 Claims, 16 Drawing Sheets

(51) Int. Cl.
*B64D 47/08* (2006.01)
*G01C 21/20* (2006.01)
*G06K 7/14* (2006.01)
*G06K 9/00* (2006.01)
*G06K 19/06* (2006.01)
*G08G 5/00* (2006.01)
*G08G 5/04* (2006.01)

(52) U.S. Cl.
CPC ......... *G06K 7/1417* (2013.01); *G06K 9/0063* (2013.01); *G06K 19/06037* (2013.01); *G08G 5/0069* (2013.01); *G08G 5/045* (2013.01)

(56) References Cited

U.S. PATENT DOCUMENTS

| | | | |
|---|---|---|---|
| 6,779,716 B1* | 8/2004 | Grow | F41A 21/00 235/375 |
| 7,050,891 B2 | 5/2006 | Chen | |
| 7,689,001 B2* | 3/2010 | Kim | G01S 3/784 382/103 |
| 7,706,917 B1 | 4/2010 | Chiappetta et al. | |
| 7,845,560 B2* | 12/2010 | Emanuel | G01S 5/16 235/462.08 |
| 8,634,958 B1* | 1/2014 | Chiappetta | G05D 1/0225 700/245 |
| 8,862,395 B2* | 10/2014 | Richardson | G01C 21/3647 235/462.01 |
| 8,909,391 B1* | 12/2014 | Peeters | G05D 1/0027 701/2 |
| 9,085,362 B1* | 7/2015 | Kilian | B64C 25/68 |
| 9,384,668 B2* | 7/2016 | Raptopoulos | H04B 7/18506 |
| 9,412,280 B1* | 8/2016 | Zwillinger | G08G 5/0069 |
| 9,513,635 B1* | 12/2016 | Bethke | G01C 21/20 |
| 9,599,990 B2* | 3/2017 | Halloran | A47L 9/1409 |
| 9,740,200 B2* | 8/2017 | Bethke | G05D 1/0094 |
| 9,898,638 B2* | 2/2018 | Jones | G06K 7/1417 |
| 9,928,649 B2* | 3/2018 | Hu | G08G 5/0013 |
| 9,947,230 B2* | 4/2018 | Hu | G09B 9/08 |
| 10,000,285 B2* | 6/2018 | Shannon | B64C 39/024 |
| 10,232,940 B2* | 3/2019 | Shannon | G05D 1/0858 |
| 10,364,030 B2* | 7/2019 | Prager | B64D 1/22 |
| 10,414,488 B2* | 9/2019 | Prager | B66D 1/60 |
| 2004/0117638 A1* | 6/2004 | Monroe | G08B 13/19682 713/186 |
| 2008/0137912 A1* | 6/2008 | Kim | H04L 67/18 382/106 |
| 2010/0009279 A1 | 1/2010 | Hidaka et al. | |
| 2010/0047756 A1* | 2/2010 | Schneider | G09B 7/02 434/350 |
| 2010/0092079 A1 | 4/2010 | Aller | |
| 2010/0250022 A1* | 9/2010 | Hines | G05D 1/101 701/2 |
| 2011/0121068 A1 | 5/2011 | Emanuel et al. | |
| 2012/0029687 A1* | 2/2012 | Hagen | B65G 1/0407 700/218 |
| 2013/0127980 A1* | 5/2013 | Haddick | G06F 3/013 348/14.08 |
| 2013/0278631 A1* | 10/2013 | Border | G06F 3/04842 345/633 |
| 2016/0054733 A1* | 2/2016 | Hollida | H04N 5/23293 701/2 |
| 2016/0068264 A1* | 3/2016 | Ganesh | G06Q 10/0833 701/2 |
| 2016/0068267 A1* | 3/2016 | Liu | G05D 1/042 701/11 |
| 2016/0180884 A1* | 6/2016 | Nowak | H04N 9/8205 386/201 |
| 2016/0227191 A1* | 8/2016 | Rabii | H04W 24/08 |
| 2016/0244187 A1* | 8/2016 | Byers | B64C 39/024 |
| 2017/0031365 A1* | 2/2017 | Sugumaran | B64C 39/024 |
| 2017/0031369 A1* | 2/2017 | Liu | G05D 1/102 |
| 2017/0039764 A1* | 2/2017 | Hu | G08G 5/0013 |
| 2017/0039859 A1* | 2/2017 | Hu | G09B 9/08 |
| 2017/0046873 A1* | 2/2017 | Terry | H04N 13/221 |
| 2017/0050749 A1* | 2/2017 | Pilskalns | B60L 53/12 |
| 2017/0061813 A1* | 3/2017 | Tao | G09B 9/08 |
| 2017/0069214 A1* | 3/2017 | Dupray | G08G 5/0021 |
| 2017/0088288 A1* | 3/2017 | Wang | B64F 1/20 |
| 2017/0090477 A1* | 3/2017 | Akselrod | G01C 21/206 |
| 2017/0213062 A1* | 7/2017 | Jones | G06K 7/1417 |
| 2018/0096183 A1* | 4/2018 | Jones | G06K 7/1417 |
| 2019/0025822 A1* | 1/2019 | Sentosa | G08B 13/19602 |

FOREIGN PATENT DOCUMENTS

| | | |
|---|---|---|
| CN | 100464271 C | 2/2009 |
| CN | 102426019 A | 4/2012 |
| CN | 102967305 A | 3/2013 |
| CN | 102991681 A | 3/2013 |
| CN | 103218607 A | 7/2013 |
| CN | 103869819 A | 6/2014 |
| CN | 104035091 A | 9/2014 |
| CN | 104049641 A | 9/2014 |
| EP | 0977014 B1 | 9/2005 |
| EP | 2778819 A1 | 9/2014 |
| WO | 2016065623 A1 | 5/2016 |

OTHER PUBLICATIONS

Google Machine Translation of Chinese Patent Pub. No. CN 104049641 A1 to Yan et al. (downloaded on Aug. 26, 2019).*
NPL, Jensfelt, Patric, Approaches to Mobile Localization in Indoor Environments, Automatic Controls, Department of Signals and Sensors and Systems, Royal Institute of Technology, Doctoral Thesis, SE-100, 44 Stockholm, Sweden (2001) (hereinafter "Jensfelt").*
Google patents machine translation of Chinese Patent Pub. No. CN 106068592A1 Systems and Methods for Battery Exhange (downloaded on Nov. 13, 2019).*
Engligh Translation of "Computer Vision Scheme Used for the Automatic Landing of Unmanned Helicopter on Ship Deck", Jun. 8, 2019.
Xiaojian Wang et al., Computer vision scheme for autonomous landing of unmanned helicopter on ship deck, Journal Beijing University of Aeronautics and Astronautics, Jun. 2007, p. 686-689, vol. 33, No. 6, Beijing, China.
Gui and Lei et al., Airborne Vision-Based Navigation Method for UAV Accuracy Landing Using Infrared Lamps, J Intell Robot Syst (2013) 72:197-218 DOI 10.1007/s10846-013-9819-5 (Mar. 15, 2013) Springer Science Business Media Dordrecht 2013 (https://link.springer.com/content/pdf/10.1007%2Fs10846-013-9819-5.pdf).
Jensfelt, Patric, Approaches to Mobile Localization in Indoor Environments, Automatic Controls, Department of Signals and Sensors and Systems, Royal Institute of Technology, Doctoral Thesis, SE-100, 44 Stockholm, Sweden (2001) (https://www.diva-portal.org/smash/get/diva2:8964/FULLTEXT01.pdf) (hereinafter "Jensfelt").
World Intellectual Property Organization (WIPO) International Search Report and Written Opinion for PCT/CN2014/090078 dated Jul. 22, 2015.

* cited by examiner

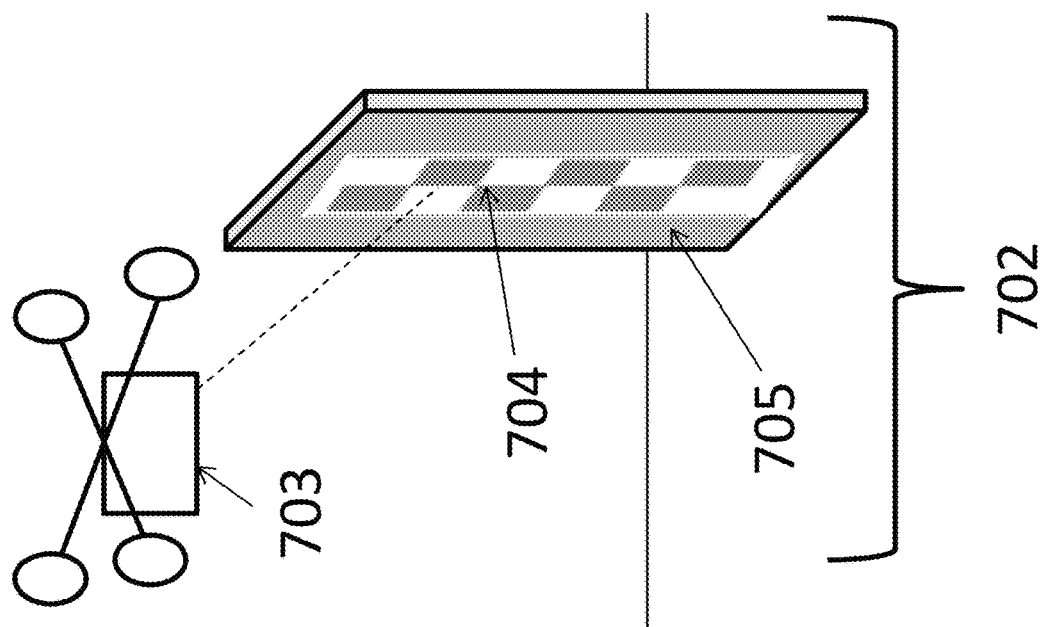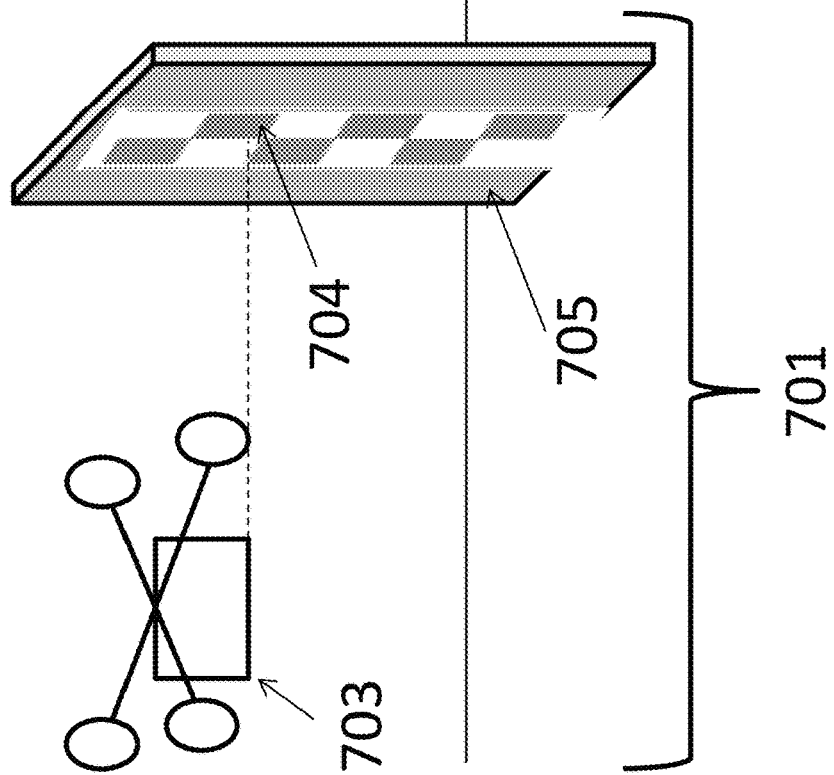
FIG. 7

SYSTEMS AND METHODS FOR SURVEILLANCE WITH A VISUAL MARKER

CROSS-REFERENCE

This application is a continuation of application Ser. No. 15/289,384, filed on Oct. 10, 2016, which is a continuation of International Application No. PCT/CN2014/090078, filed on Oct. 31, 2014. The above-referenced applications are hereby incorporated by reference in their entireties.

BACKGROUND OF THE DISCLOSURE

Aerial vehicles such as unmanned aerial vehicles (UAVs) can be used for performing surveillance, reconnaissance, and exploration tasks for military and civilian applications. Such aerial vehicles may carry a payload configured to perform a specific function.

Typical UAVs may communicate with external systems when navigating an environment. A UAV may be operating in an environment in which navigation signals such as signals from global positioning software signals (GPS) are weak. This may lead to challenges with autonomous navigation of UAVs

SUMMARY OF THE DISCLOSURE

A need exists to provide a method of navigating an unmanned aerial vehicle (UAV) in an environment without relying on signal strength and reliability of navigation sensors such as global positioning software signals (GPS). Provided herein are systems and methods for positioning and navigating a UAV in an environment. The systems and methods further provide the ability to communicate directions to a UAV for surveillance and navigation purposes. Markers may be provided in an environment to aid in UAV navigation. The markers may be visual markers that may permit a UAV to get its bearings and/or convey instructions to the UAV.

In an aspect of the present disclosure, a method for conducting surveillance of an environment comprises positioning an unmanned aerial vehicle (UAV) within the environment, wherein said positioning is determined by detecting, using one or more vision sensors of the UAV, one or more visual markers having visual patterns and attached to one or more surfaces within the environment; and collecting visual images and/or audio data within the environment using one or more sensors of the UAV, thereby conducting the surveillance of the environment.

The environment can be an indoor environment. The environment can be an environment in which global position system (GPS) signals are not reliable. The positioning of the UAV can include determining a position for the UAV in a three-dimensional space.

In some embodiments the UAV can weigh less than 1000 g and have a greatest dimension of no more than 100 cm.

The vertices of shapes in the visual patters can be detected and used to calculate positioning relative to one or more visual markers. The one or more visual markers can include a ribbon having a visual pattern that includes squares. The visual patter can include squares of different colors. The verities of the squares can be detected and used to calculate a dimension of the portion of the visual pattern.

The method can further comprise determining, with aid of one or more processors, a location of the UAV within a three-dimensional coordinate system based on the visual patterns. The three-dimensional coordinate system can be a global coordinate system. The three-dimensional coordinate system can be a local coordinate system.

The method can further comprise identifying the visual patterns and effecting a response by the UAV based on the identified visual patterns.

In some instances, positioning can comprise calculating a rotation and a position of the UAV relative to a visual marker using (1) one or more intrinsic properties of the one or more vision sensors on board the UAV, (2) a known position of the visual marker, and (3) a set of points in an image of the visual marker taken by the vision sensor on board the UAV.

At least one of the one or more vision sensors can be a camera. The UAV can be conducting surveillance within the environment while moving autonomously. The positioning of the UAV can occur with aid of one or more processors that are on-board the UAV.

In some embodiments, the method can further comprise detecting, with aid of one or more sensor on-board the UAV, an obstacle; and adjusting direction of the UAV's flight to avoid the obstacle.

Positioning can be determined with aid of an infrared or radar detector.

In an aspect of the disclosure, a method of positioning an unmanned aerial vehicle (UAV) can comprise: capturing, with aid of one or more vision sensors of the UAV while the UAV is in flight, an image including a visual marker having a visual pattern and affixed to a surface within the environment; calculating a dimension of at least a portion of the visual pattern of the visual marker in the image; and determining, with aid of one or more processors, a location of the UAV within a three-dimensional coordinate system, based on the dimension of the portion of the visual pattern.

The environment can be an indoor environment. The environment can be an environment in which global position system (GPS) signals are not reliable.

In some embodiments the UAV can weigh less than 1000 g and have a greatest dimension of no more than 100 cm.

The dimension can be between vertices of shapes in the visual pattern.

The vertices of shapes in the visual patters can be detected and used to calculate positioning relative to one or more visual markers. The one or more visual markers can include a ribbon having a visual pattern that includes squares. The visual patter can include squares of different colors. The verities of the squares can be detected and used to calculate a dimension of the portion of the visual pattern.

The method can further comprise determining, with aid of one or more processors, a location of the UAV within a three-dimensional coordinate system based on the visual patterns. The three-dimensional coordinate system can be a global coordinate system. The three-dimensional coordinate system can be a local coordinate system.

The method can further comprise identifying the visual patterns and effecting a response by the UAV based on the identified visual patterns.

In some instances, positioning can comprise calculating a rotation and a position of the UAV relative to a visual marker using (1) one or more intrinsic properties of the one or more vision sensors on board the UAV, (2) a known position of the visual marker, and (3) a set of points in an image of the visual marker taken by the vision sensor on board the UAV. The dimension can be used to calculate a distance of the UAV from the visual marker. The dimension can be used to calculate and angle of the UAV relative to the visual marker.

At least one of the one or more vision sensors can be a camera. The UAV can be patrolling the environment autonomously when the one or more vision sensors capture the image. One or more processors can be on-board the UAV.

In some embodiments, the method can further comprise detecting, with aid of one or more sensor on-board the UAV, an obstacle; and adjusting direction of the UAV's flight to avoid the obstacle.

The method can further comprise detecting, with aid of one or more sensor on-board the UAV, an obstacle; and adjusting direction of the UAV's flight to avoid the obstacle.

Positioning can be determined with aid of an infrared or radar detector.

In an aspect of the disclosure, a system positioning an unmanned aerial vehicle (UAV) within an environment can comprise: one or more vision sensors of the UAV configured to capture an image including a visual marker having a visual pattern and affixed to a surface within the environment, while the UAV is in flight; and one or more processors, individually or collectively configured to: (1) calculate a dimension of at least a portion of the visual pattern of the visual marker in the image; and (2) determine a location of the UAV within a three-dimensional coordinate system, based on the dimension of the portion of the visual pattern.

The environment can be an indoor environment. The environment can be an environment in which GPS signals are not reliable. The UAV can weigh less than 1000 g and have a greatest dimension of no more than 100 cm.

The marker dimension can be between vertices of shapes in the visual pattern. The visual marker can be a ribbon having a visual pattern that includes squares. The visual pattern can include squares of different colors. The vertices of the squares can be detected and used to calculate the dimension of the portion of the visual patter. The three-dimensional coordinate system can be a three-dimensional global coordinate system. The three dimensional coordinate system can be a three-dimensional local coordinate system. The visual pattern can be identified and a response can be effected by the UAV based on the identified visual pattern.

The one or more processors can be configured to calculate a rotation and a position of the UAV relative to a visual marker using one or more intrinsic properties of the one or more vision sensors on board the UAV, a known position of the visual marker, and a set of points in an image of the visual marker taken by the vision sensor on board the UAV.

At least one of the one or more vision sensors can be a camera. The dimension can be used to calculate a distance of the UAV from the visual marker. The dimension can be used to calculate an angle of the UAV relative to the visual marker.

The UAV can be patrolling the environment autonomously when the one or more vision sensors capture the image. The one or more processors can be on-board the UAV. The UAV can be further configured to detect, with aid of one or more sensor on-board the UAV, an obstacle; and adjust a direction of the UAV's flight to avoid the obstacle.

Positioning can be determined with aid of an infrared or radar detector.

In another aspect of the disclosure, a method of positioning an unmanned aerial vehicle (UAV) within an environment can comprise: capturing, with aid of one or more vision sensors of the UAV while the UAV is in flight, an image including a visual marker having a unique visual pattern within the environment and affixed to a surface within the environment; identifying and distinguishing the visual marker from a plurality of different markers based on the unique visual pattern of the visual marker in the image, wherein the identified visual marker has a known location that is different from locations of the plurality of different markers; and determining, with aid of one or more processors, a location of the UAV within a three-dimensional coordinate system, based on the known location of the identified visual marker.

The environment can be an indoor environment. The environment can be an environment in which GPS signals are not reliable. The UAV can weigh less than 1000 g and have a greatest dimension of no more than 100 cm.

The vertices of shapes in the visual patterns can be detected and used to calculate positioning relative to the one or more visual markers. The visual marker can be a ribbon having a unique visual pattern that includes squares. The unique visual patter can include squares of different colors. The unique visual pattern can include AprilTags. The unique visual pattern can include QR codes. The unique visual pattern can include barcodes.

The method can further comprise calculating a dimension of at least a portion of the unique visual pattern of the visual marker in the image; and determining, with aid of the one or more processors, the location of a UAV within the three-dimensional coordinate system, based on the dimension of the portion of the unique visual pattern.

The three-dimensional coordinate system can be a three-dimensional global coordinate system. The three dimensional coordinate system can be a three-dimensional local coordinate system.

The method can further comprise identifying the visual patterns and effecting a response by the UAV based on the identified visual patterns.

The method can further comprise comprising positioning the UAV within the environment by calculating a rotation and a position of the UAV relative to a visual marker using one or more intrinsic properties of the one or more vision sensors on board the UAV, a known position of the visual marker, and a set of points in an image of the visual marker taken by the vision sensor on board the UAV.

The one or more processors can be on-board the UAV. The UAV can be patrolling the environment autonomously when the one or more vision sensors capture the image. The method can further comprise detecting, with aid of one or more sensor on-board the UAV, an obstacle; and adjusting direction of the UAV's flight to avoid the obstacle.

Positioning can be determined with aid of an infrared or radar detector.

In another aspect of the disclosure, a system for positioning an unmanned aerial vehicle (UAV) within an environment can comprise: one or more vision sensors of the UAV configured to capture an image including a visual marker having a unique visual pattern within the environment and affixed to a surface within the environment, while the UAV is flight; and one or more processors, individually or collectively configured to: identify and distinguish the visual marker from a plurality of different markers based on the unique visual pattern of the visual marker in the image, wherein the identified visual marker has a known location that is different from locations of the plurality of different markers; and determine a location of the UAV within a three-dimensional coordinate system, based on the known location of the identified visual marker.

The environment can be an indoor environment. The environment can be an environment in which GPS signals are not reliable. The UAV can weigh less than 1000 g and have a greatest dimension of no more than 1000 cm.

The vertices of shapes in the visual pattern can be detected and used to calculate positioning relative to the one or more visual markers. The visual marker can be a ribbon having a unique visual patter that includes squares. The unique visual patter can include squares of different colors. The unique visual pattern can include AprilTags. The unique visual pattern can include QR codes. The unique visual pattern can include barcodes.

The one or more processors can be configured to calculate a dimension of at least a portion of the unique visual pattern of the visual marker in the image; and determine the location of a UAV within the three-dimensional coordinate system, based on the dimension of the portion of the unique visual pattern.

The three-dimensional coordinate system can be a three-dimensional global coordinate system. The three dimensional coordinate system can be a three-dimensional local coordinate system.

The visual pattern can be identified and a response can be effected by the UAV based on the identified visual patterns.

One or more processors can be configured to calculate a rotation and a position of the UAV relative to a visual marker using one or more intrinsic properties of the one or more vision sensors on board the UAV, a known position of the visual marker, and a set of points in an image of the visual marker taken by the vision sensor on board the UAV.

At least one of the one or more vision sensors can be a camera. The UAV can be patrolling the environment autonomously when the one or more vision sensors capture the image. One or more processors can be on-board the UAV. Positioning can be determined with aid of an infrared or radar detector.

In another aspect of the disclosure, a method of positioning an unmanned aerial vehicle (UAV) within an environment can comprise: capturing, with aid of one or more vision sensors of the UAV while the UAV is in flight, an image including a visual marker having a visual pattern; identifying and distinguishing, with aid of one or more processors, the visual pattern from a plurality of different patterns, wherein the identified visual pattern elicits a response from the UAV that is different from responses elicited by the plurality of different patterns; and effecting the response by the UAV to the identified visual pattern of the visual marker.

The environment can be an indoor environment. The environment can be an environment in which GPS signals are not reliable. The UAV can weigh less than 1000 g and have a greatest dimension of no more than 100 cm.

The vertices of shapes in the visual patterns can be detected and used to calculate positioning relative to the one or more visual markers. The visual marker can be a ribbon having a unique visual pattern that includes squares. The unique visual patter can include squares of different colors. The unique visual pattern can include AprilTags. The unique visual pattern can include QR codes. The unique visual pattern can include barcodes.

The response can be independent of flight of the UAV. The response can include adjusting a position of a payload of the UAV. The payload can be a camera on-board the UAV. The response can include capturing an image of a selected subject. The response can occur within a predetermined amount of time after the visual patter is identified and distinguished. The response can occur within a predetermined distance after the visual patter is identified and distinguished. The response can include changing an attitude of the UAV. The response can include causing the UAV to flying in a particular direction and/or with a particular speed. The response can include causing the UAV to fly up or down stairs. The response can affect flight of the UAV. The response can include causing the flight of the UAV to follow a set of preset instructions. In some cases, the visual marker is a ribbon and the response includes causing the flight of the UAV to follow along the ribbon.

The method can further comprise calculating a dimension of at least a portion of the unique visual pattern of the visual marker in the image; and determining, with aid of the one or more processors, the location of a UAV within the three-dimensional coordinate system, based on the dimension of the portion of the unique visual pattern.

The three-dimensional coordinate system can be a three-dimensional global coordinate system. The three dimensional coordinate system can be a three-dimensional local coordinate system. The local coordinate of the UAV can be calculated by adopting a perspective N points (PNP) algorithm The method can further comprise comprising positioning the UAV by calculating a rotation and a position of the UAV relative to a visual marker using one or more intrinsic properties of the one or more vision sensors on board the UAV, a known position of the visual marker, and a set of points in an image of the visual marker taken by the vision sensor on board the UAV. At least one of the one or more vision sensors can be a camera.

The one or more processors can be on-board the UAV. The UAV can be patrolling the environment autonomously when the one or more vision sensors capture the image. The method can further comprise detecting, with aid of one or more sensor on-board the UAV, an obstacle; and adjusting direction of the UAV's flight to avoid the obstacle. The positioning can also be determined with aid of an infrared or radar detector.

In another aspect of the disclosure, a system for positioning an unmanned aerial vehicle (UAV) within an environment can comprise: one or more vision sensors of the UAV configured to capture an image including a visual marker having a visual pattern, while the UAV is flight; and one or more processors, individually or collectively configured to: (1) identify and distinguish, with aid of one or more processors, the visual pattern from a plurality of different patterns, wherein the identified visual pattern elicits a response from the UAV that is different from responses elicited by the plurality of different patterns; and (2) effect the response by the UAV to the identified visual pattern of the visual marker.

The environment can be an indoor environment. The environment can be an environment in which GPS signals are not reliable. The UAV can weigh less than 1000 g and have a greatest dimension of no more than 100 cm.

The vertices of shapes in the visual patterns can be detected and used to calculate positioning relative to the one or more visual markers. The visual marker can be a ribbon having a unique visual pattern that includes squares. The unique visual patter can include squares of different colors. The unique visual pattern can include AprilTags. The unique visual pattern can include QR codes. The unique visual pattern can include barcodes.

The response can be independent of flight of the UAV. The response can include adjusting a position of a payload of the UAV. The payload can be a camera on-board the UAV. The response can include capturing an image of a selected subject. The response can occur within a predetermined amount of time after the visual patter is identified and distinguished. The response can occur within a predetermined distance after the visual patter is identified and distinguished. The response can include changing an attitude of the UAV. The response can include causing the UAV to flying in a particular direction and/or with a particular speed. The response can include causing the UAV to fly up or down stairs. The response can affect flight of the UAV. The response can include causing the flight of the UAV to follow a set of preset instructions. In some cases, the visual marker is a ribbon and the response includes causing the flight of the UAV to follow along the ribbon.

The system can further comprise calculating a dimension of at least a portion of the visual pattern of the visual marker in the image; and determining, with aid of the one or more processors, the location of a UAV within the three-dimensional coordinate system, based on the dimension of the portion of the visual pattern.

The three-dimensional coordinate system can be a three-dimensional global coordinate system. The three dimensional coordinate system can be a three-dimensional local coordinate system. The local coordinate of the UAV can be calculated by adopting a perspective N points (PNP) algorithm The one or more processors are configured to calculate a rotation and a position of the UAV relative to a visual marker using one or more intrinsic properties of the one or more vision sensors on board the UAV, a known position of the visual marker, and a set of points in an image of the visual marker taken by the vision sensor on board the UAV. At least one of the one or more vision sensors can be a camera.

The UAV can be patrolling the environment autonomously when the one or more vision sensors capture the image. The one or more processors can be on-board the UAV. The system can further comprise detecting, with aid of one or more sensor on-board the UAV, an obstacle; and adjusting direction of the UAV's flight to avoid the obstacle. The positioning can also be determined with aid of an infrared or radar detector.

In another aspect of the disclosure, a method of positioning an unmanned aerial vehicle (UAV) within an environment can comprise: providing a plurality of visual markers within the environment, wherein each of the visual markers within the environment have a visual pattern that is unique for the environment; capturing, with aid of one or more vision sensors of the UAV while the UAV is in flight within the environment, an image including a detected visual marker having an identified visual pattern from said plurality of visual markers; effecting, with aid of one or more processors, a navigation response by the UAV to the detected visual marker having the identified visual pattern.

The navigation response can include determining a location of the UAV in a three-dimensional coordinate system. The navigation response can include causing the UAV to fly in accordance with a set of preset flight commands. The navigation response can include causing the UAV to fly to a predetermined location relative to the detected visual marker. The navigation response can include causing the UAV to fly to a location from which the one or more vision sensors of the UAV are configured to capture an image of a different visual marker from the detected visual marker. The environment can be an indoor environment. The environment can be an environment in which global position systems (GPS) signals are not reliable. The UAV can weigh less than 1000 g and have a greatest dimension of no more than 100 cm.

The vertices of shapes in the visual patterns can be detected and used to calculate positioning relative to the one or more visual markers. The visual marker can be a ribbon having a unique visual pattern that includes squares. The unique visual patter can include squares of different colors. The unique visual pattern can include AprilTags. The unique visual pattern can include QR codes. The unique visual pattern can include barcodes.

The response can be independent of flight of the UAV. The response can include adjusting a position of a payload of the UAV. The payload can be a camera on-board the UAV. The response can include capturing an image of a selected subject. The response can occur within a predetermined amount of time after the visual patter is identified and distinguished. The response can occur within a predetermined distance after the visual patter is identified and distinguished. The response can include changing an attitude of the UAV. The response can include causing the UAV to flying in a particular direction and/or with a particular speed. The response can include causing the UAV to fly up or down stairs. The response can affect flight of the UAV. The response can include causing the flight of the UAV to follow a set of preset instructions. In some cases, the visual marker is a ribbon and the response includes causing the flight of the UAV to follow along the ribbon.

The method can further comprise calculating a dimension of at least a portion of the visual pattern of the visual marker in the image; and determining, with aid of the one or more processors, the location of a UAV within the three-dimensional coordinate system, based on the dimension of the portion of the visual pattern.

The three-dimensional coordinate system can be a three-dimensional global coordinate system. The three dimensional coordinate system can be a three-dimensional local coordinate system. The local coordinate of the UAV can be calculated by adopting a perspective N points (PNP) algorithm The method can further comprise positioning the UAV within the environment by calculating a rotation and a position of the UAV relative to a visual marker using one or more intrinsic properties of the one or more vision sensors on board the UAV, a known position of the visual marker, and a set of points in an image of the visual marker taken by the vision sensor on board the UAV.

At least one of the one or more vision sensors can be a camera. The UAV can be patrolling the environment autonomously when the one or more vision sensors capture the image. The one or more processors can be on-board the UAV. The method can further comprise detecting, with aid of one or more sensor on-board the UAV, an obstacle; and adjusting direction of the UAV's flight to avoid the obstacle. The positioning can also be determined with aid of an infrared or radar detector.

In another aspect of the disclosure, method of positioning an unmanned aerial vehicle (UAV) within an environment can comprise: providing a continuous visual marker within the environment, wherein the continuous visual marker provides a path within the environment; capturing, with aid of one or more vision sensors of the UAV while the UAV is in flight within the environment, an image including at least a portion of the continuous visual marker having a visual pattern; effecting a flight response by the UAV to keep the continuous visual marker within visual range of the UAV.

The continuous marker can be a ribbon. The environment can be an indoor environment. The environment can be an environment in which GPS signals are not reliable. The UAV can weigh less than 1000 g and have a greatest dimension of no more than 100 cm.

The vertices of shapes in the visual patterns can be detected and used to calculate positioning relative to the one or more visual markers. The visual marker can be a ribbon having a unique visual pattern that includes squares. The unique visual patter can include squares of different colors.

The unique visual pattern can include AprilTags. The unique visual pattern can include QR codes. The unique visual pattern can include barcodes.

The response can be independent of flight of the UAV. The response can include adjusting a position of a payload of the UAV. The payload can be a camera on-board the UAV. The response can include capturing an image of a selected subject. The response can occur within a predetermined amount of time after the visual patter is identified and distinguished. The response can occur within a predetermined distance after the visual patter is identified and distinguished. The response can include changing an attitude of the UAV. The response can include causing the UAV to flying in a particular direction and/or with a particular speed. The response can include causing the UAV to fly up or down stairs. The response can affect flight of the UAV. The response can include causing the flight of the UAV to follow a set of preset instructions. In some cases, the visual marker is a ribbon and the response includes causing the flight of the UAV to follow along the ribbon.

The UAV can be patrolling the environment autonomously when the one or more vision sensors capture the image. The method can further comprise detecting, with aid of one or more sensor on-board the UAV, an obstacle; and adjusting direction of the UAV's flight to avoid the obstacle. Positioning can also be determined with aid of an infrared or radar detector.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 7 shows a UAV detecting and avoiding an obstacle by determining a position based on detection of a visual marker.

DETAILED DESCRIPTION OF THE EMBODIMENTS

Figure 1:
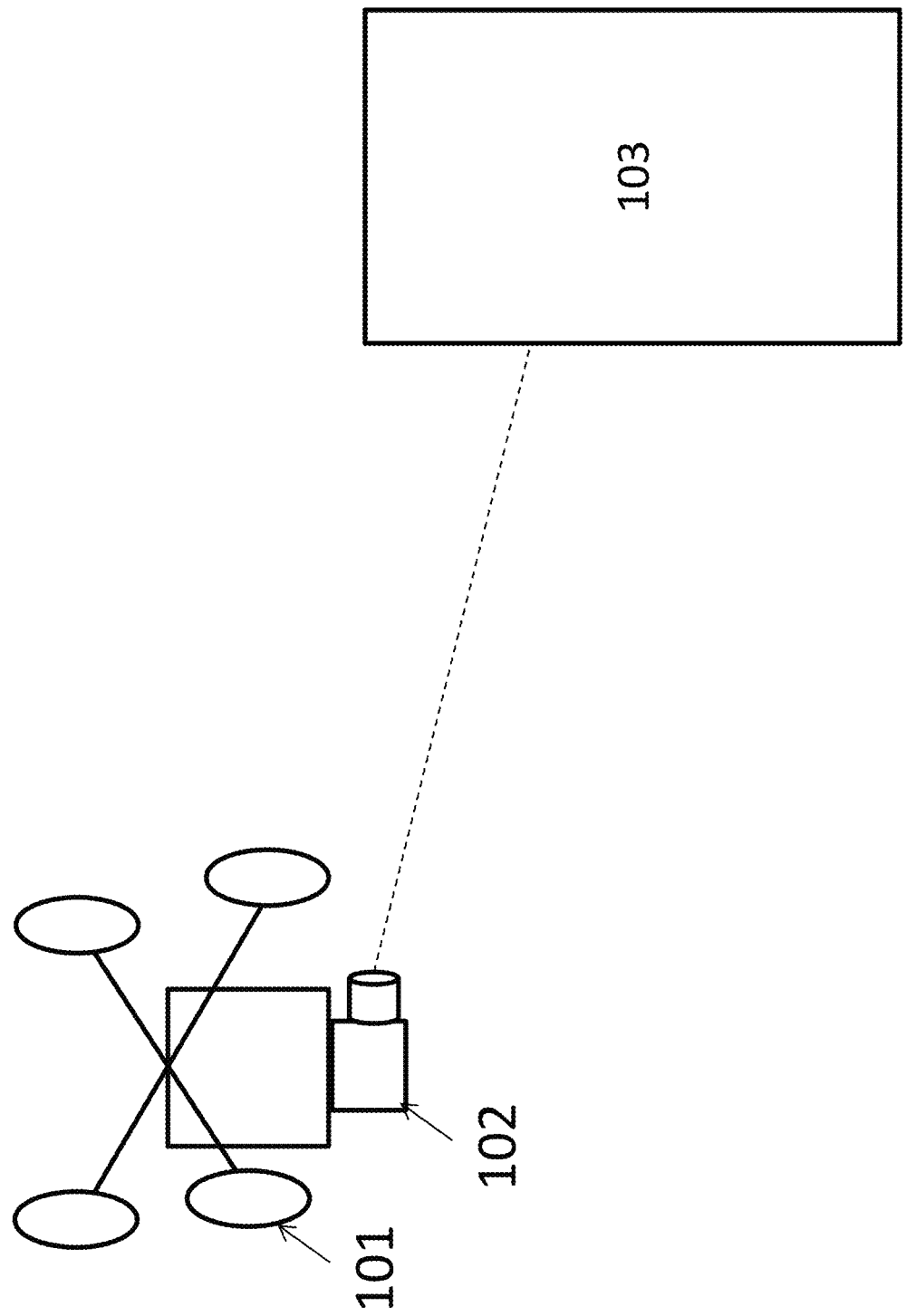
FIG. 1 shows a UAV configured to conduct surveillance in an environment.

The systems, devices, and methods of the present disclosure provide positioning methods for automatically aiding an unmanned aerial vehicle (UAV) in navigating an environment. Description of the UAV may be applied to any other type of unmanned vehicle, or any other type of movable object.

A UAV may be provided to patrol an environment to collect information about the environment or one or more subjects in the environment. The UAV can follow a defined path through an environment or the UAV can follow an unstructured path. The UAV can autonomously or semi-autonomously follow a subject of interested and collect sensory data pertaining to the subject on interest. Sensory data can be visual data, audio data, location data, and/or movement data. A UAV in a surveillance environment can receive commands from an off board control center through a communication network. The communication network can be wired or wireless. In some cases the UAV can receive communication from a pattern recognition mechanism that interprets instructions encoded on a visual marker placed in an environment.

The UAV can collect visual information in an environment. Visual information can be collected using a vision sensor. In some cases, a vision sensor can be a camera. A vision sensor can also be used to detect a visual marker to determine the location of a UAV in an environment. In some cases, one vision sensor can be used for both detection visual markers and collecting visual information in an environment. In other cases, the UAV can have at least two vision sensors such that a first vision sensor is configured to detect visual markers and a second vision sensor is configured to collect visual information in the environment. The vision sensors can be located in a body of the UAV or the vision sensors can be an external payload attached to the UAV. The UAV can also collect audio information in an environment using an audio sensor, for example a microphone. The collected information can be collected and stored on a memory storage device located on board or off board the UAV. The collected information can be monitored by a user in real time. Alternatively, the collected information can be stored on a memory storage device and reviewed by a user after collection. In some cases the UAV can emit an audio or visual signal as a warning or indication that the UAV has entered or exited a specified location.

Visual markers that may be detected by one or more vision sensors of the UAV may be distributed about an environment. The visual markers may or may not be visually distinguishable from one another. The visual markers may be at known locations, and may be useful for determining a UAV location. The visual markers may also be useful for aiding a UAV in navigating an environment and/or performing a task within the environment.

The UAV can be configured to perform surveillance tasks in an environment to carry out a security assessment. The UAV can collect information in the environment using a plurality of sensors in communication with one or more processors on board or off board the UAV. The processors can interpret the collected information in order to determine events that may indicate a hazard or unsafe condition. The UAV can be instructed by the processor to produce and alarm when a hazard or unsafe condition is detected by the processor.

FIG. 1 shows an example of an unmanned aerial vehicle (UAV) 101. The UAV 101 can have one or more sensors. The UAV 101 may comprise one or more vision sensors 102 such as an image sensor. For example, an image sensor may be a monocular camera, stereo vision camera, radar, sonar, or an infrared camera. The UAV 101 may further comprise other sensors that may be used to determine a location of the UAV, such as global positioning system (GPS) sensors, inertial sensors which may be used as part of or separately from an inertial measurement unit (IMU) (e.g., accelerometers, gyroscopes, magnetometers), lidar, ultrasonic sensors, acoustic sensors, WiFi sensors. The UAV can have sensor on board on board the UAV that collect information directly from an environment without contacting an additional component off board the UAV for additional information or processing. For example, a sensor that collects data directly in an environment can be a vision or audio sensor. Alternatively, the UAV can have sensors that are on board the UAV but contact one or more components off board the UAV to collect data about an environment. For example, a sensor that contacts a component off board the UAV to collect data about an environment may be a GPS sensor or another sensor that relies on connection to another device, such as a satellite, tower, router, server, or other external device. Various examples of sensors may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, inertial measurement units (IMUs)), altitude sensors, attitude sensors (e.g., compasses) pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own energy source) and passive sensors (e.g., sensors that detect available energy). As another example, some sensors may generate absolute measurement data that is provided in terms of a global coordinate system (e.g., position data provided by a GPS sensor, attitude data provided by a compass or magnetometer), while other sensors may generate relative measurement data that is provided in terms of a local coordinate system (e.g., relative angular velocity provided by a gyroscope; relative translational acceleration provided by an accelerometer; relative attitude information provided by a vision sensor; relative distance information provided by an ultrasonic sensor, lidar, or time-of-flight camera). The sensors onboard or off board the UAV may collect information such as location of the UAV, location of other objects, orientation of the UAV 101, or environmental information. A single sensor may be able to collect a complete set of information in an environment or a group of sensors may work together to collect a complete set of information in an environment. Sensors may be used for mapping of a location, navigation between locations, detection of obstacles, or detection of a target. Sensors may be used for surveillance of an environment or a subject of interest 103.

Any description herein of a UAV 101 may apply to any type of movable object. The description of a UAV may apply to any type of unmanned movable object (e.g., which may traverse the air, land, water, or space). The UAV may be capable of responding to commands from a remote controller. The remote controller may be not connected to the UAV, the remote controller may communicate with the UAV wirelessly from a distance. In some instances, the UAV may be capable of operating autonomously or semi-autonomously. The UAV may be capable of following a set of pre-programmed instructions. In some instances, the UAV may operate semi-autonomously by responding to one or more commands from a remote controller while otherwise operating autonomously. For instance, one or more commands from a remote controller may initiate a sequence of autonomous or semi-autonomous actions by the UAV in accordance with one or more parameters.

The UAV 101 may be an aerial vehicle. The UAV may have one or more propulsion units that may permit the UAV to move about in the air. The one or more propulsion units may enable the UAV to move about one or more, two or more, three or more, four or more, five or more, six or more degrees of freedom. In some instances, the UAV may be able to rotate about one, two, three or more axes of rotation. The axes of rotation may be orthogonal to one another. The axes of rotation may remain orthogonal to one another throughout the course of the UAV's flight. The axes of rotation may include a pitch axis, roll axis, and/or yaw axis. The UAV may be able to move along one or more dimensions. For example, the UAV may be able to move upwards due to the lift generated by one or more rotors. In some instances, the UAV may be capable of moving along a Z axis (which may be up relative to the UAV orientation), an X axis, and/or a Y axis (which may be lateral). The UAV may be capable of moving along one, two, or three axes that may be orthogonal to one another.

The UAV 101 may be a rotorcraft. In some instances, the UAV may be a multi-rotor craft that may include a plurality of rotors. The plurality of rotors may be capable of rotating to generate lift for the UAV. The rotors may be propulsion units that may enable the UAV to move about freely through the air. The rotors may rotate at the same rate and/or may generate the same amount of lift or thrust. The rotors may optionally rotate at varying rates, which may generate different amounts of lift or thrust and/or permit the UAV to rotate. In some instances, one, two, three, four, five, six, seven, eight, nine, ten, or more rotors may be provided on a UAV. The rotors may be arranged so that their axes of rotation are parallel to one another. In some instances, the rotors may have axes of rotation that are at any angle relative to one another, which may affect the motion of the UAV.

The UAV shown may have a plurality of rotors. The rotors may connect to the body of the UAV which may comprise a control unit, one or more sensors, processor, and a power source. The sensors may include vision sensors and/or other sensors that may collect information about the UAV environment. The information from the sensors may be used to determine a location of the UAV. The rotors may be connected to the body via one or more arms or extensions that may branch from a central portion of the body. For example, one or more arms may extend radially from a central body of the UAV, and may have rotors at or near the ends of the arms.

A vertical position and/or velocity of the UAV may be controlled by maintaining and/or adjusting output to one or more propulsion units of the UAV. For example, increasing the speed of rotation of one or more rotors of the UAV may aid in causing the UAV to increase in altitude or increase in altitude at a faster rate. Increasing the speed of rotation of the one or more rotors may increase the thrust of the rotors. Decreasing the speed of rotation of one or more rotors of the UAV may aid in causing the UAV to decrease in altitude or decrease in altitude at a faster rate. Decreasing the speed of rotation of the one or more rotors may decrease the thrust of the one or more rotors. When a UAV is taking off, the output may be provided to the propulsion units may be increased from its previous landed state. When the UAV is landing, the output provided to the propulsion units may be decreased from its previous flight state. The UAV may be configured to take off and/or land in a substantially vertical manner.

A lateral position and/or velocity of the UAV may be controlled by maintaining and/or adjusting output to one or more propulsion units of the UAV. The altitude of the UAV and the speed of rotation of one or more rotors of the UAV may affect the lateral movement of the UAV. For example, the UAV may be tilted in a particular direction to move in that direction and the speed of the rotors of the UAV may affect the speed of the lateral movement and/or trajectory of movement. Lateral position and/or velocity of the UAV may be controlled by varying or maintaining the speed of rotation of one or more rotors of the UAV.

The UAV 101 may be of small dimensions. The UAV may be capable of being lifted and/or carried by a human. The UAV may be capable of being carried by a human in one hand.

The UAV 101 may have a greatest dimension (e.g., length, width, height, diagonal, diameter) of no more than 100 cm. In some instances, the greatest dimension may be less than or equal to 1 mm, 5 mm, 1 cm, 3 cm, 5 cm, 10 cm, 12 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 220 cm, 250 cm, or 300 cm. Optionally, the greatest dimension of the UAV may be greater than or equal to any of the values described herein. The UAV may have a greatest dimension falling within a range between any two of the values described herein.

The UAV 101 may be lightweight. For example, the UAV may weigh less than or equal to 1 mg, 5 mg, 10 mg, 50 mg, 100 mg, 500 mg, 1 g, 2 g, 3 g, 5 g, 7 g, 10 g, 12 g, 15 g, 20 g, 25 g, 30 g, 35 g, 40 g, 45 g, 50 g, 60 g, 70 g, 80 g, 90 g, 100 g, 120 g, 150 g, 200 g, 250 g, 300 g, 350 g, 400 g, 450 g, 500 g, 600 g, 700 g, 800 g, 900 g, 1 kg, 1.1 kg, 1.2 kg, 1.3 kg, 1.4 kg, 1.5 kg, 1.7 kg, 2 kg, 2.2 kg, 2.5 kg, 3 kg, 3.5 kg, 4 kg, 4.5 kg, 5 kg, 5.5 kg, 6 kg, 6.5 kg, 7 kg, 7.5 kg, 8 kg, 8.5 kg, 9 kg, 9.5 kg, 10 kg, 11 kg, 12 kg, 13 kg, 14 kg, 15 kg, 17 kg, or 20 kg. The UAV may have a weight greater than or equal to any of the values described herein. The UAV may have a weight falling within a range between any two of the values described herein.

The UAV 101 may comprise vision sensors, such as a monocular camera, stereo vision camera, radar, sonar, or an infrared camera. The UAV 101 may further comprise sensors, such as GPS, IMU, lidar, or any other types of sensors described elsewhere herein. The sensors onboard the UAV may collect information such as location of the UAV, location of other objects, orientation of the UAV 101, or environmental information. A single sensor may be able to fully determine any one of the aforementioned parameters or a group of sensors may work together to determine one of the listed parameters. Sensors may be used for mapping of a location, navigation between locations, detection of obstacles, detection of a target, or surveillance of an object or environment of interest.

The sensors may be located onboard or off board the UAV. The onboard sensors may be located on the body of the UAV 101. The sensors may be attached to the outside of the body of the UAV 101 and/or the sensor may be attached to the inside of the body of the UAV 101. The sensors may be centrally located in a single region on the body. Alternatively, the sensors may be located in different locations on the body. The sensors may be permanently or removably attached to the UAV 101. The UAV 101 may have a carrier which may be configured to carry a payload. Sensors may be attached to the carrier.

The sensors may be characterized by one or more sensors parameters. The sensor parameters may be intrinsic or extrinsic parameters. An intrinsic parameter may relate to the internal configuration of a sensor. Example of intrinsic parameters may include focal length, scale factor, radial distortion coefficients, and tangential distortion coefficients. Intrinsic parameters may be any parameters that are dependent on hardware configurations, in some cases the intrinsic parameters may be set by a factory setting for the sensor. Extrinsic parameters may relate to the spatial relationship between any two or more sensors. Each sensor may have a relative coordinate system independent of other sensors on board the UAV. Extrinsic properties may be important for sensor fusion, combining data from sensors in different locations on the UAV. Sensor fusion may involve a process of transforming the relative coordinates of a given sensor to match the reference frame of another sensor.

A UAV may be configured to conduct surveillance in a space or environment. The space may be an outdoor or indoor space or a combination of indoor and outdoor spaces. The UAV may automatically or semi-automatically position itself in the space. The UAV may position itself with a location sensor, for example a GPS sensor. Alternatively, the UAV may position itself by interpreting images of visual markers. Visual markers may be an alternative locating mechanism to locating sensors in environments where locating sensors are not reliable. Visual markers may be used in combination with one or more types of locating sensors. The visual markers may have a locating marker. The visual markers may be adhered or attached to one or more surfaces in the space or environment.

Data regarding flight of the UAV may be correlated with data captured by one or more sensor of the UAV used for surveillance. For example a location of the UAV (e.g., latitude, longitude, altitude or any other coordinate system), attitude of the UAV (e.g., angle about a roll, pitch, and/or yaw axis) may be stored. The information about the UAV, such as location and attitude may be correlated with timing data. For example, a clock may be provided on-board the UAV or an external device that may keep track of time for positioning of the UAV. The time data may be associated with the corresponding location and/or attitude of the UAV. This time-based data may be correlated with data captured by one or more sensors of the UAV, such as image data captured by a camera on-board the UAV. Optionally, camera data (e.g., attitude of camera relative to the UAV and/or timing information) may be correlated with the other data. In some embodiments, the UAV may be able to rotate freely about at least 45 degrees, 90 degrees, 180 degrees, 270 degrees, 360 degrees, or 720 degrees about any of the axes described herein. A payload (e.g., camera) may be able to rotate freely about at least 45 degrees, 90 degrees, 180 degrees, 270 degrees, 360 degrees, or 720 degrees about any of the axes described herein relative to the UAV. This data may be useful for determining positioning of the UAV and understanding the positioning of a region captured by the sensor (e.g., field of view captured by the camera) during surveillance.

Figure 2:
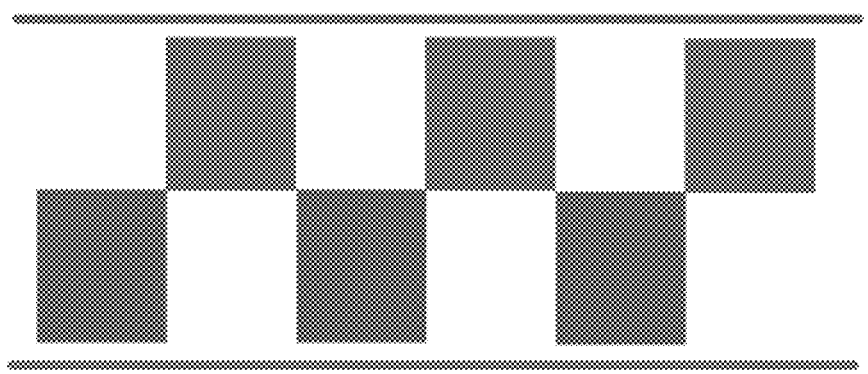
FIG. 2 shows an example of a visual marker.

FIG. 2 shows an example of a locating marker. The locating marker can be present in an indoor environment, such as within a building. The interior of the building may have weak or absent GPS signal. The locating marker may be adhered to a surface in an environment. One or more locating markers and/or a continuous ribbon of locating markers can be present throughout an environment. One or more locating markers and/or a continuous ribbon of locating markers can be adhered to a surface or surfaces in a room, hallway, alcove, closet, or other enclosure. The environment may be an indoor environment. The locating marker may have a discrete shape. For instance, the locating marker may be a square, rectangle, circle, triangle, hexagon, or have any other shape. The locating marker can be adhered to a ceiling, wall, support beam, object, or floor in an indoor environment. The locating marker can be a continuous ribbon. The locating marker can be a series of unconnected markers of uniform or non-uniform dimension. The locating marker may be black and white or the locating marker may be a plurality of colors. The locating marker may comprise a plurality of geometric shapes with recognizable vertices. The plurality of geometric shapes may comprise a visual pattern. The geometric shapes may be triangles, squares, pentagons, hexagons, or any other regular or irregular polygon. The locating marker visual pattern may comprise at least one type of polygon. The locating marker can comprise a repeating pattern, checkerboard, rows and/or columns of repeating polygons, or an array of polygons. The locating marker can have shapes of alternating colors in a consistent repetitive pattern. In the example shown in FIG. 2 the marker comprises a set of squares. The example maker in FIG. 2 shows black and white squares, alternatively the squares may be other colors.

In an alternate embodiment, the marker may not be a visual marker. The marker can be detected by another sensory interaction. In some cases, the marker can be an audio marker. The marker can provide an audio or visual warning when the UAV leaves or enters a specified location. The marker can emit an acoustic disturbance in a frequency range that can be detected by the UAV. The frequency range of the emitted acoustic disturbance can be in a frequency range outside of a frequency range detected by humans. The UAV can determine its location by analyzing a distortion in the acoustic disturbance. The acoustic disturbance can instruct a UAV to move to perform a mission. In another case, the marker can emit an RFID, radio, or WiFi signal that can be detected by the UAV and processed by the UAV to determine position. In some embodiments the marker can emit a detectable substance, for example a gas. The detectable substance can be safe for inhalation and consumption by humans and other animals. The UAV can determine its location relative to the marker using the concentration of the gas at a location where the UAV detects the gas and the diffusive properties of the gas.

Different markers at different locations may be distinguishable from one another. For example, different markers may emit different signals. In one example, a sound emitted by a first audio marker may be different from a sound emitted by a second audio marker. The sounds may have different frequencies, harmonics, or patterns. Thus, by recognizing the sound pattern, the UAV may be able to distinguish whether the UAV is near a first audio marker at a first location vs. a second audio marker at a second location. Similarly, different radios may emit different signals, or different gas markers may emit gases of different compositions. A UAV may be able to determine its location based on the identified marker and a known location of the identified marker.

Any description herein of a visual marker or locating marker may apply to any other type of marker, including non-visual markers, and vice versa.

The locating marker can be a manufactured from a paper or plastic material. The locating marker can be a screen display (e.g. liquid crystals display (LCD), touch screen, LED screen, OLED screen, or plasma screen display). Alternatively, the locating marker can be projected on to a surface from a projector installed in the environment. The locating marker can be a screen display or projector in communication with a computer unit. The locating marker can be static (e.g. constant) or dynamic (e.g. changeable). The computer unit can change the pattern on the locating marker. Changing the pattern can change the interaction of the UAV with the locating marker. The locating marker can be adhered to a surface with glue, resin, magnets, or hardware components (e.g. screws, fasteners, Velcro, rivets, nails, or snaps). The locating marker can be permanently or removably attached to a surface.

In an environment the visual markers may be uniform. An environment may contain only one type of visual marker, wherein a type of visual marker may refer to a specific pattern on a visual marker. Differences in the pattern on a visual marker may be differences in the type of shapes in the pattern, number of shapes in the pattern, color of shapes in the pattern, ratio of sizes of the shapes in the pattern, and/or differences in a coded pattern. In some cases an environment may contain more than one type of visual marker. Different visual markers in an environment may be recognized by different UAVs. A processor on or off board the UAV may be configured to distinguish between different visual markers. In an example different UAVs may be UAVs with different missions, with different functions, or belonging to different companies. In some embodiments a UAV may be configured to recognize and follow only one type of visual markers.

For example, a first UAV may be configured to recognize a visual marker of a first type without recognizing a visual marker of a second type. A second UAV may be configured to recognize a visual marker of a second type without recognizing a visual marker of a first type. For example, a first visual marker type may include alternating black and white squares. A second visual marker type may include alternating red and green circles. The first UAV may only recognize the black and white square pattern as a visual marker while ignoring the red and green circle pattern. Similarly, the second UAV may only recognize the red and green circle pattern as a visual marker while ignoring the black and white square pattern.

The UAV may recognize static patterns. For example, a UAV may recognize a still image as a visual marker. The still image may change from a first still image to a second still image. For instance, the visual marker may be implemented as a screen that may show the first still image, and then change to a second still image. In some instances, a UAV may recognize both still images as markers, or different UAVs may recognize the still images as markers (e.g., a first UAV may recognize a first still image as a marker while a second UAV may recognize a second still image as a marker). In some instances, a UAV may recognize a visual marker that may change. The actual variance or sequence of change may be part of what permits the UAV to recognize the visual marker. The UAV may recognize the change of the visual marker over time in order to identify the visual marker. For instance, the visual marker may be implemented as a screen that may show a video sequence.

Visual markers may be interpreted by a UAV to determine the position or location of the UAV in an environment. Visual markers can be used to position a UAV in an environment in cases where global positioning system (GPS) signals are not reliable. In an example, GPS signals may be unreliable in indoor environments and in remote locations. The UAV may be able to determine its location within the environment locally or globally. A local location may refer to a location relative to an object, landmark, or known position in an environment. In an example, a local location can be a cardinal direction extremity of an environment (e.g. north end of a building) or a distance above and angle away from an object or landmark (e.g. at an azimuthal angle of 30°, attitude of 45°, and a radial distance of 10 feet from a landmark). Alternatively, a UAV can determine its global location in an environment. Global location can be a location in space for example a longitude and latitude. A UAV may be in an environment to conduct surveillance. Additionally, visual markers may communicate an instruction to the UAV. An instruction may be a command related to the UAV position, the UAV mission, the UAV sensors, information processing, and/or interaction with persons, objects, or vehicles in the environment. A UAV may perform the command within a specified time interval after receiving the command. A UAV may perform the command after traveling a specified distance from the marker that communicated the command. A command may involve controlling the motion of the UAV. In an example, an instruction can be to increase or decrease altitude, change directional heading, land on a surface, turn on or off a sensor, capture data with a sensor, transmit sensor data to an off board server or processor, or interact with another vehicle or object in the environment. An instruction can elicit a response from a UAV. In an example, a response can be adjusting position of a payload, swapping of a payload, capturing an image of a selected subject, causing the UAV to fly or head in a specific direction, at a specific speed or acceleration, and/or altitude, or causing the UAV to fly up or down stairs. The instruction to switch a payload can comprise instructions to pick up a payload, unload a payload, and/or add an additional payload. The instruction can designate a specific location to bring a payload. In some cases the instruction can be to sound an alarm provided on board the UAV.

Figure 4:
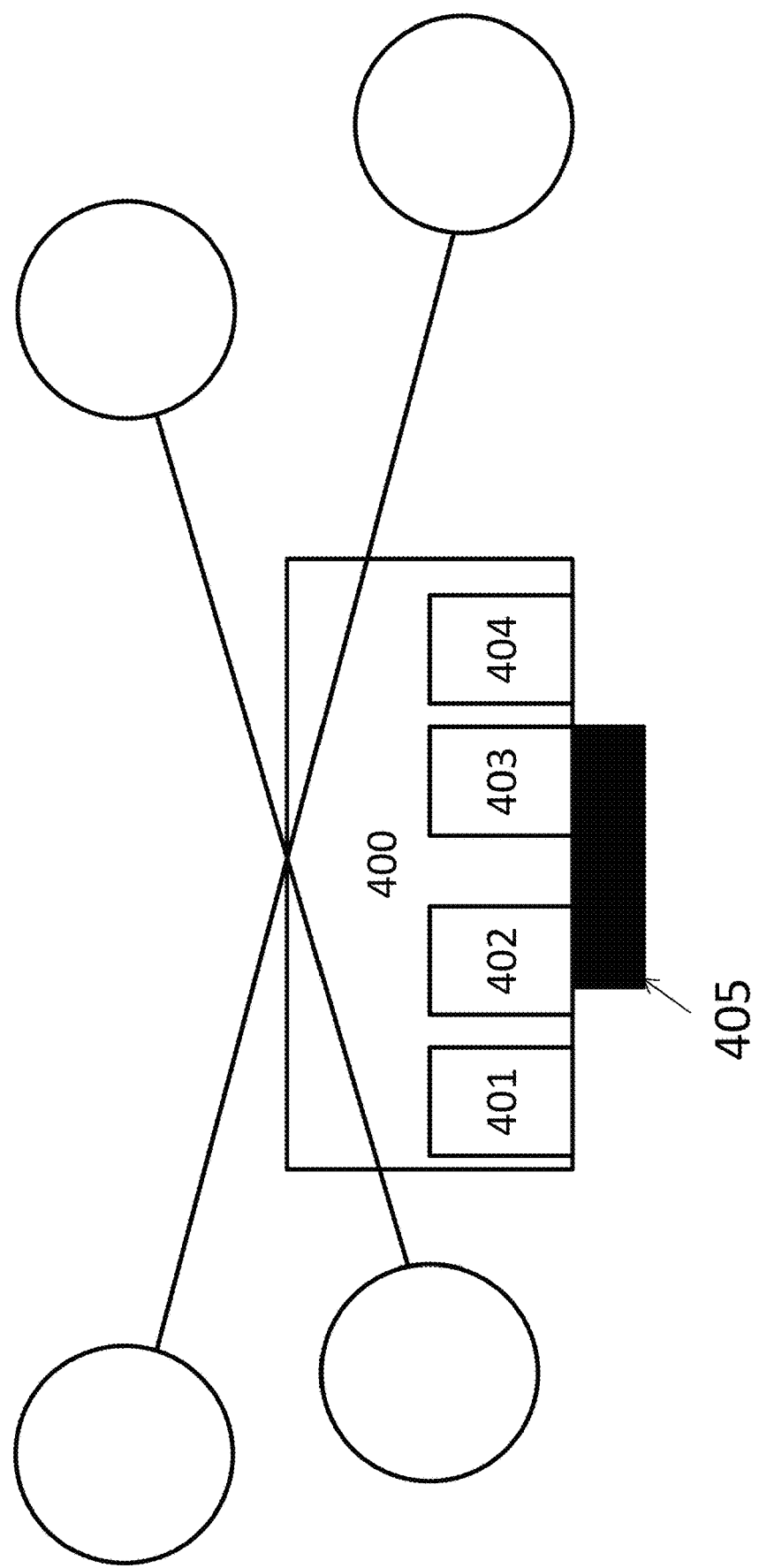
FIG. 4 shows a UAV with on board components.

The visual marker can be detected by a vision sensor on board a UAV. FIG. 4 shows a diagram with possible components that may exist on board the UAV 400. The UAV 400 can have one or more sensors 401. The one or more sensors can include a vision sensor such as a monocular camera. The one or more sensors can be in electronic or network communication through a wired or wireless connection with a processor 402. The processor can be configured to conduct an analysis on the sensor data. The analysis can include determining or calculating the position of the UAV using the sensor data. The UAV can further comprise an on board memory storage device 403. The memory storage device can be in electronic or network communication with the processor and/or one or more sensors through a wired or wireless connection. The memory storage device can have stored information about an environment. The stored information about the environment can pertain to the geographic location of the environment in a global coordinate system, the layout of the environment, the dimension of one or more spaces in the environment, the features in an environment, and/or locations and dimensions of objects in the environment. In an example, the stored information can be a blueprint, a map, or a floor plan. The stored information may also include location of the visual markers. Location of the markers may be related to the blueprint, map, or floor plan. The information stored on the memory storage device can be updated periodically or updated when a change occurs in an environment. The information stored on the memory storage device can be updated by a device in communication with the memory storage device wirelessly or through a wired connection. In an alternate embodiment the UAV can be provided with information about an environment from a storage device off board the UAV. The UAV 400 can also include a power source 404, for example a battery, on board the UAV. The UAV can be configured to carry a payload 405, the payload can be an additional sensor, cargo, or a backup battery. The payload 405 can be rotated and translated to achieve a plurality of orientations relative to the UAV 400.

The visual sensors can communicate an instruction to the UAV through a pattern recognition mechanism. The pattern recognition can be performed by the processor on the UAV. The processor can be configured to recognize a pattern and may determine that the pattern communicates a command for a function or action. In some cases the pattern may be a QR code, AprilTag, or bar code. The pattern can include any shape, image, icon, letter, symbol, number, or pattern. The pattern may be a one-dimensional pattern, two-dimensional pattern or three-dimensional pattern. For instance, the pattern may include ridges or bumps that may protrude and be recognizable by the UAV.

The UAV may know the location of each visual marker or a ribbon of visual markers. The location of the visual markers can be stored in a memory device on board or off board the UAV. Each visual marker or ribbon of visual markers can have a unique location. The UAV may be configured to locate a specific visual marker and to know the location of that visual marker.

Figure 3:
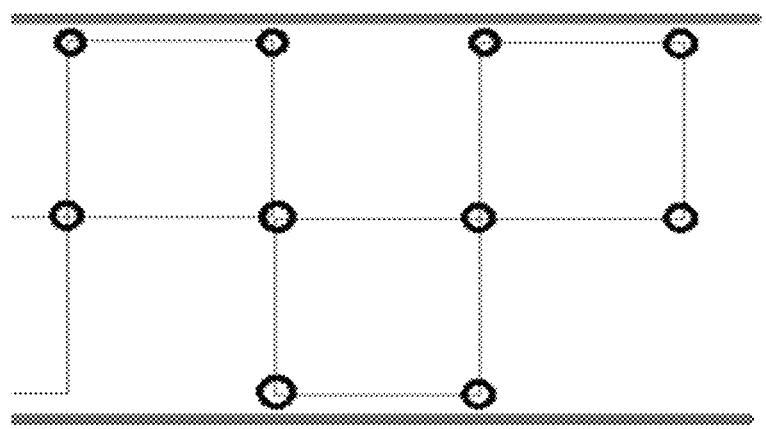
FIG. 3 shows an example of vertices of a visual marker that may be detected by a UAV.

The UAV can be configured to locate the vertices of the polygon or polygons on the locating marker. FIG. 3 shows the vertices that can be detected by a UAV. The UAV can detect the vertices of the squares, or other polygons, and calculate a dimension of the visual pattern. A dimension of the visual pattern can be interpreted to determine a location of the UAV. The location of the UAV can be determined in a three-dimensional coordinate system. The three-dimensional coordinate system can be a global coordinate system or a relative or local coordinate system.

The UAV can detect a visual pattern and capture an image of the visual pattern with a camera. The UAV may capture an image of a portion of the visual pattern or the entirety of the visual pattern. The UAV may have one or more processors configured to process the image of the visual pattern. The one or more processors may be on board or off board the UAV. The processor may be in communication with one or more memory storage devices. The image of the visual pattern may be stored on the memory storage device. A UAV may determine the distance between two or more vertices using the one or more processors. A UAV may determine the angle between one or more vertices using the one or more processors. The distance and angle between the vertices may comprise a dimension of the visual marker. The dimension of the visual marker may be used as an input to calculate the UAV's distance from the marker and angle relative to the marker.

Figure 5:
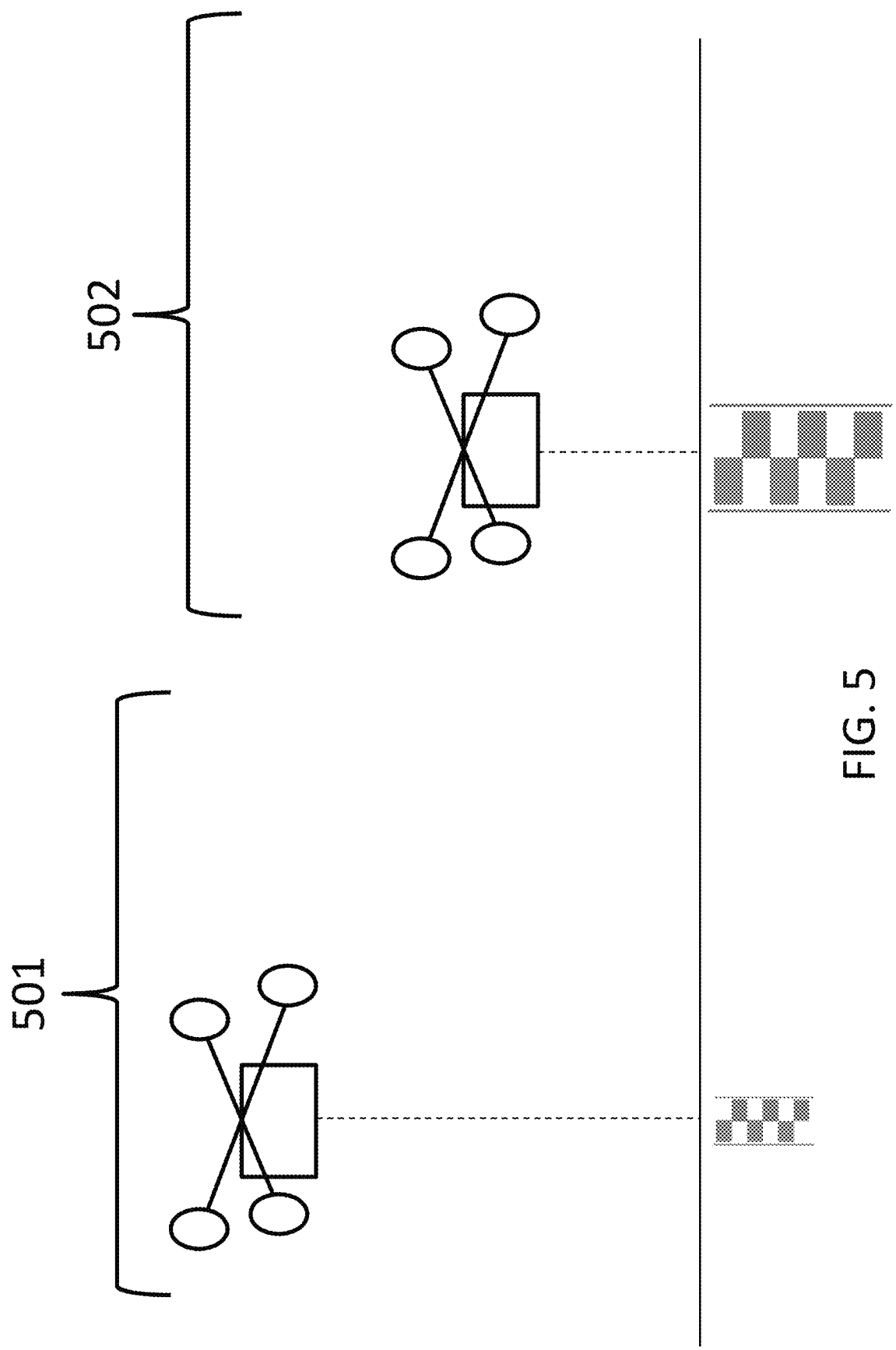
FIG. 5 shows a UAV detecting a visual marker from two vertical positions.

The dimensional perception of the visual marker by the UAV may be a function of the location of the UAV relative to the visual marker. The perceived size of the visual marker may vary with the distance between the UAV and the visual marker. The size of the marker can be described as the distance between detected vertices of the polygons on the marker. A UAV can determine its height or vertical distance from a marker based on the apparent size of the marker relative to a known marker size. The marker can appear smaller than its actual dimension when the UAV is a relatively large vertical distance from the marker. An example of a change in visual perception of the marker as a function of UAV vertical position (height) is shown in FIG. 5. In a first position the UAV is vertically relatively far from the visual marker 501. The UAV can approach the visual marker vertically such that in a second position 502 the visual marker appears relatively larger. The change in apparent marker size as a function of vertical distance from the marker can be known and may be stored in a memory storage device on board or off board the UAV. The change in apparent marker size as a function of vertical distance from the marker can be determined from a calibration or from a known mathematical relationship.

Figure 6:
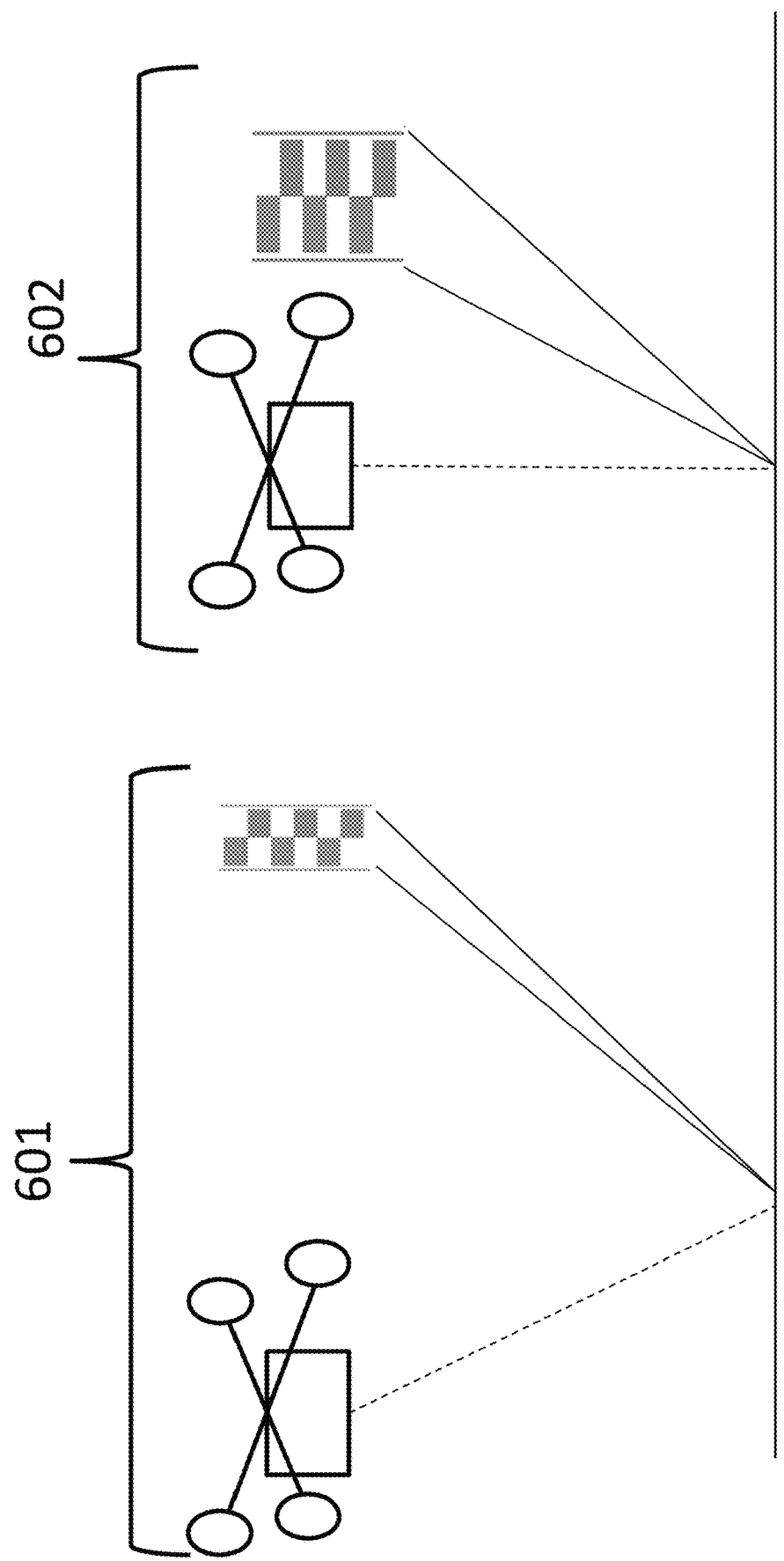
FIG. 6 shows a UAV detecting a visual marker from two horizontal positions.

The UAV can detect a distortion in the shape of the marker as a function of offset from the marker or horizontal displacement from the marker. Distortion can be measured as a discrepancy in the angles between coordinates of the detected vertices of the marker polygons. In a case in which the polygons are squares the UAV may expect the square to have four vertices at 90° angles to each other. When the UAV is offset from a marker containing squares, or other polygons, the angles between the vertices can appear distorted. In a case in which the UAV is offset from a marker containing squares the shape of the square can be distorted such that it appears to the UAV as a rhombus. Similar distortions can occur with other shapes. An example of the described distortion detection is described in FIG. 6, a UAV can approach a marker horizontally. The angle of the vertices can vary as a function of horizontal distance from the marker. The angle between the vertices can be distorted when the UAV is some distance from the marker. In a first case 601, when the UAV is a horizontal distance away from the marker the angle between the vertices can appear shortened to the UAV. As the UAV approaches the marker horizontally, such that the UAV is directly above the marker, the angle between the vertices can elongate to the true undistorted angle 602.

The perceived distortion of the visual marker can be analyzed to determine the horizontal and vertical location of the UAV relative to the marker. One or more processors can determine a location or position of the UAV in a three-dimensional coordinate system based on the visual marker. The one or more processors can determine a location or position of the UAV in a three-dimensional coordinate system based on the visual marker while the UAV is in flight. The marker location in three-dimensional space can be known, therefore determining the location of the UAV relative to the marker can result in a determination of the location of the UAV in three-dimensional space.

A radar or infrared detector can also aid in determining the location of the UAV in three-dimensional space. In the case of radar detection the UAV can emit a radar signal or the marker can emit a radar signal. The UAV can interpret an emitted or reflected radar signal to determine its distance from a surface or obstacle. The UAV can use the detection of a surface or obstacle and compare to a stored floor plan or blueprint to determine the UAV's location in an environment. Similarly the UAV can comprise an infrared detector to detect surfaces or obstacles in an environment. The UAV can compare detected obstacles and/or surfaces against a known environment layout to determine its location in the environment.

The location of the UAV in three-dimensional space can be a location in global or local three-dimensional space. The UAV can capture an image of the visual marker using a vision sensor on board the UAV. The vision sensor on board the UAV can be a vision sensor that is used for surveillance of the environment or the vision sensor can be a separate vision sensor configured to detect a visual marker. The vision sensor may be a monocular camera, stereo vision camera, radar, sonar, or an infrared camera. In some cases the vision sensor can capture an image. The image can be stored on or off board the UAV on a memory storage device. The vision sensor image can be analyzed by a processor on board or off board the UAV. The processor can analyze the vision sensor image to determine the extrinsic properties of the vision sensor. In cases where the vision sensor is a camera, the extrinsic properties of the camera can be the rotation (R) of the camera relative to the visual marker and the position (t) of the camera relative to the visual marker. The extrinsic properties can be calculated using an N-point perspective (Perspective n points) algorithm which can solve for a camera's position based on a correspondence relationship from three dimensional points to two dimensional points. In this case, the three dimensional points can be the known location of the visual marker vertices. The two dimensional points can be the points corresponding to the vertices in the visual marker in one or more camera images. The camera images can represent a two dimensional projection of the three dimensional visual marker. The algorithm can further include variables corresponding to the camera's intrinsic properties. Intrinsic properties (K) can be parameters that are specific to the camera's design or components. The intrinsic properties can change or drift and may be pre-calibrated or recalibrated prior to the beginning of a surveillance mission of a UAV. The camera's intrinsic properties can be the focal length, principal point, and/or lens distortion. Minimizing error between the known location of the image vertices in three dimensional space ($X_i$) and the location of the vertices in the camera image ($x_i$) with the following equation can solve for the camera position as a defined by R and t as a function of the three dimensional points, two dimensional points, and camera intrinsic properties (K), $$\min_{R,t} \sum_i \|x_i - K[R|t]X_i\|^2$$

The perspective n points algorithm can determine the position of a camera or other visual sensor on board a UAV. The location of the camera on board the UAV can be known relative to the center of mass of the UAV and/or relative to other sensors or components on board the UAV. The location of the camera relative to other components or sensors on board the UAV can be combined with the determined location of the camera to determine the location of the components or sensors on board the UAV.

Determining the location of the UAV based on a determination of a camera on board the UAV can be used for obstacle avoidance. The visual marker can be adhered to an obstacle, for example, a wall, pillar, door, or other object. The UAV can automatically recognize the obstacle or the visual marker can have a particular pattern that communicates to the UAV that the visual marker is adhered to an obstacle. The UAV can capture and analyze the visual marker to determine the distance from the obstacle. In response to the determined distance the UAV can adjust its heading and/or altitude to avoid the detected obstacle. The UAV can collect a series of images as it approaches the obstacle to determine the change in relative position between the UAV and the obstacle as it changes its heading and/or altitude. An example of an obstacle detection and avoidance event with a visual marker is shown in FIG. 7. In a first location 701 a UAV 703 can detect a visual marker 704. The visual marker 704 can have a pattern that can indicate to the UAV 703 that the visual marker 704 is adhered to an obstacle 705. The UAV can capture an image of the visual marker and can analyze the image to determine the location of the UAV relative to the location of the visual marker. The UAV can adjust its position to achieve a second location 702. After adjusting location the UAV 703 can capture a second image of the visual marker 704 to determine the new position and to verify that the new position will avoid collision or interaction with the obstacle 705. In cases in which the second position is not sufficient to avoid the obstacle the UAV can change position again and capture another image to confirm that the UAV is on track to avoid the obstacle. The process of capturing images and determining the location of the UAV can be repeated until the obstacle is successfully avoided.

In an alternate environment the UAV can automatically detect and avoid obstacles. The UAV can detect obstacles using a vision sensor such as a monocular camera, stereo vision camera, radar, sonar, or an infrared camera. The processor on board or off board the UAV can be configured to interpret data from the image sensor to detect an obstacle. The UAV can automatically adjust its route to avoid a detected obstacle. In some cases the UAV may have prior knowledge of the location of obstacles. In some cases, these obstacles may be permanent building features such as walls, beams, or pillars. The UAV may be aware of these permanent building features from an environment map or floor plan stored on a memory storage device on or off board the UAV. The UAV can automatically adjust its route to avoid a permanent building feature that may be an obstacle. A UAV can follow a continuous ribbon of visual markers or a series of consecutive discrete visual markers. While following the visual marker the UAV may encounter an obstacle. The UAV can avoid the obstacle by rerouting its path around the obstacle and then returning to the path of the visual marker. In some cases a visual marker can inform a UAV that an obstacle is obstructing a path along a ribbon or series of visual markers, the visual marker can instruct the UAV to move to avoid the obstacle and continue along the path.

Figure 8:
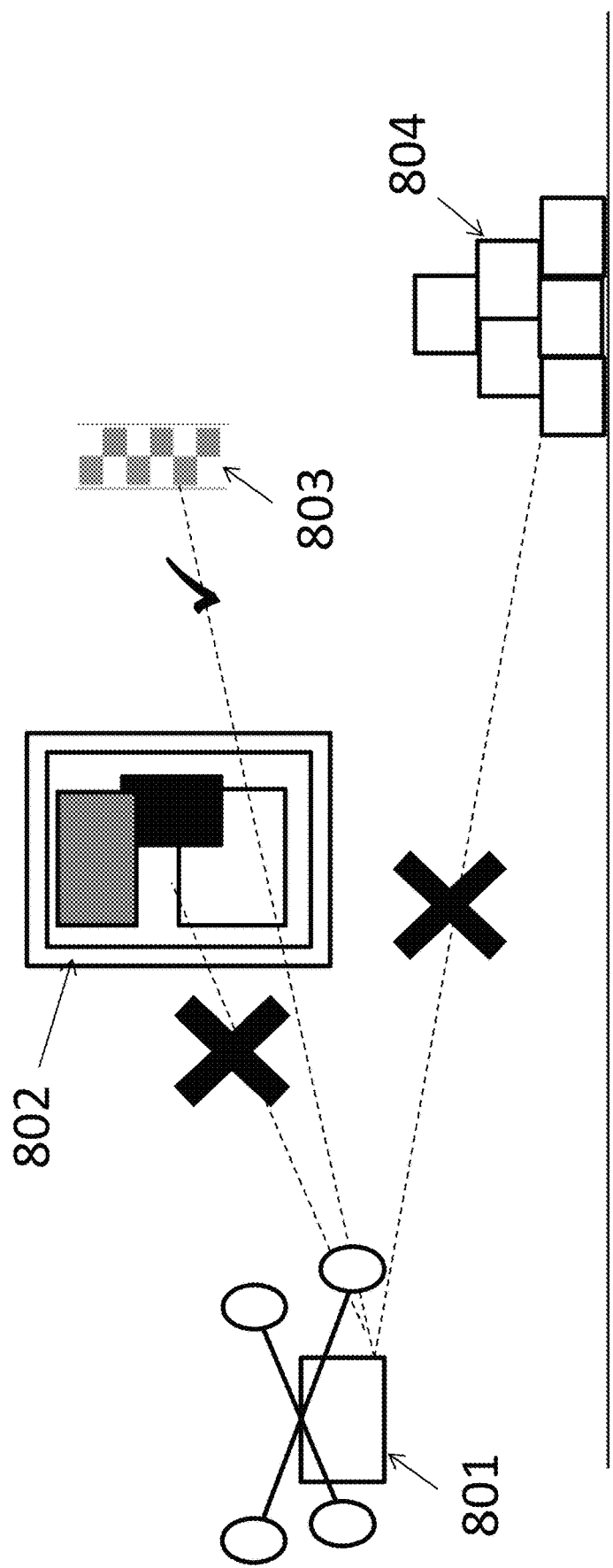
FIG. 8 shows a UAV eliminating false detection events of visual markers.

A UAV can detect a visual marker in an environment. The environment can have other objects and patterns that the UAV can distinguish from the marker. The UAV can be configured to eliminate false detection events. A false detection event may occur when a UAV detects a pattern or object with a similar visual structure of a visual marker that may be of interest to the UAV. The UAV can be configured to analyze the detected pattern or object to determine if it is the visual marker of interest or a false visual marker that has been misidentified. In an environment, a UAV can attempt to identify a visual marker by scanning for regions in the environment with the color and/or shape of the expected visual marker. The method of scanning for an expected shape and color pattern or combination can result in a set of detection regions. The UAV can further analyze the detected regions to eliminate false detection events. FIG. 8 shows an example of a UAV 801 in an environment. The UAV 801 is configured to recognize a visual marker comprising a repeating pattern of a set of shapes (e.g. square) of a given color or colors. The UAV may immediately detect a set of possible visual markers 802, 803, and 804. The UAV can further analyze the detected possible visual markers 802, 803, and 804 to eliminate false detection events. The further analysis can include processing the visual markers exact color, pattern, shape, and/or size or sizes of relative shapes in the marker. With further analysis the UAV can determine that 802 and 804 are not the visual markers of interest and therefore represent false detection events.

When a UAV detects a visual marker the UAV can determine its location based on one or more images of the visual marker and/or receive an instruction encoded by the visual marker. The instruction can elicit a navigation response by the UAV. The visual marker can include a distinction pattern that can be identified by the UAV. The UAV can detect the visual marker with a visual distinction pattern and can capture an image of the visual marker using a vision sensor while the UAV is in flight. The image of the visual pattern can be interpreted by a processor on board or off board the UAV. The processor can distinguish and identify the visual pattern from a plurality of possible visual patterns and determine that the identified visual pattern elicits a response from the UAV that is different from a response elicited by a plurality of other possible visual patterns. The processor can initiate the response elicited by the detected visual pattern.

Figure 9:
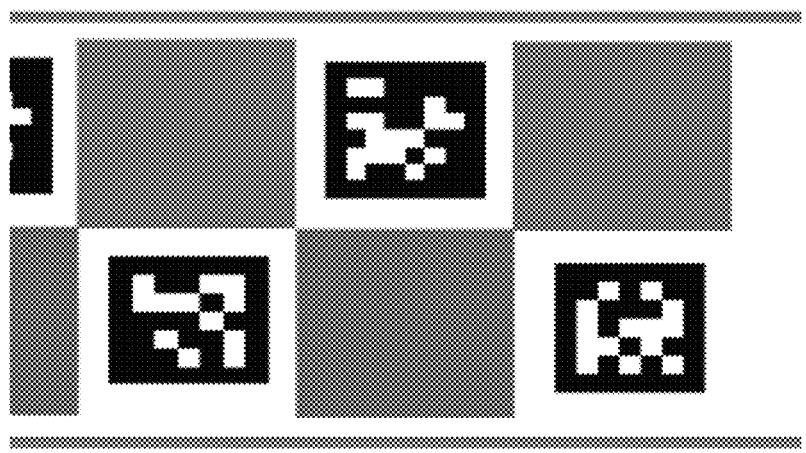
FIG. 9 shows a visual marker including a marking to communicate and instruction to a UAV.

A visual marker comprising a distinction pattern can have similar elements as a visual marker without a distinction pattern. The visual marker comprising a distinction pattern can have colored shapes in a repeating patter in addition to having a pattern that can communicate a command or piece of information to the UAV. The UAV may know the location of the visual markers comprising a distinction pattern in an environment. In some cases the distinction pattern can be Apriltag, a QR code, or a bar code. FIG. 9 shows an example of a visual marker with a distinction pattern. A UAV can distinguish from a visual marker comprising a distinction pattern and a marking that looks similar to a visual marker comprising a distinction pattern to avoid false detection events.

Figure 10:
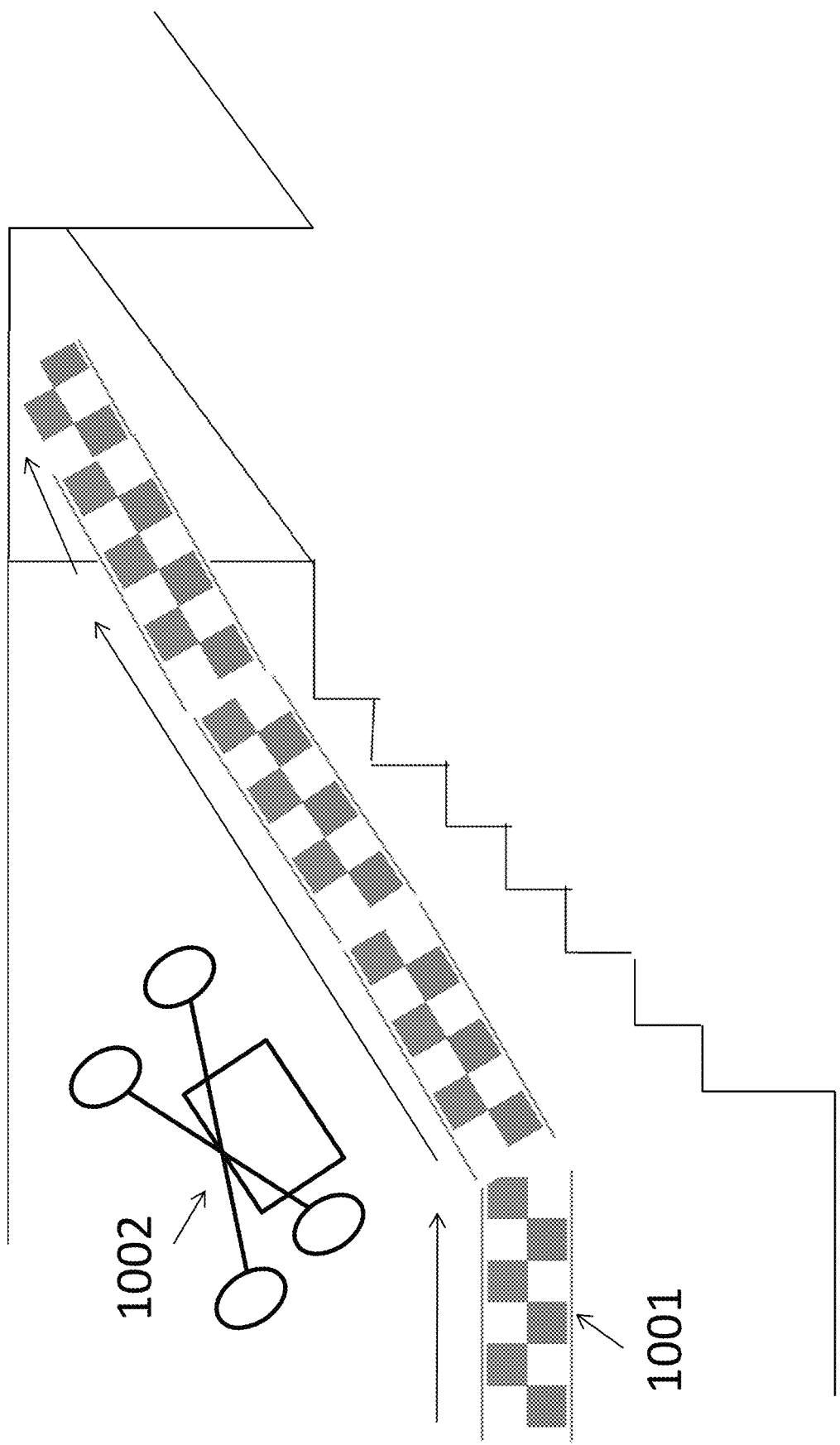
FIG. 10 shows a UAV following a ribbon of visual markers along a path.
Figure 11:
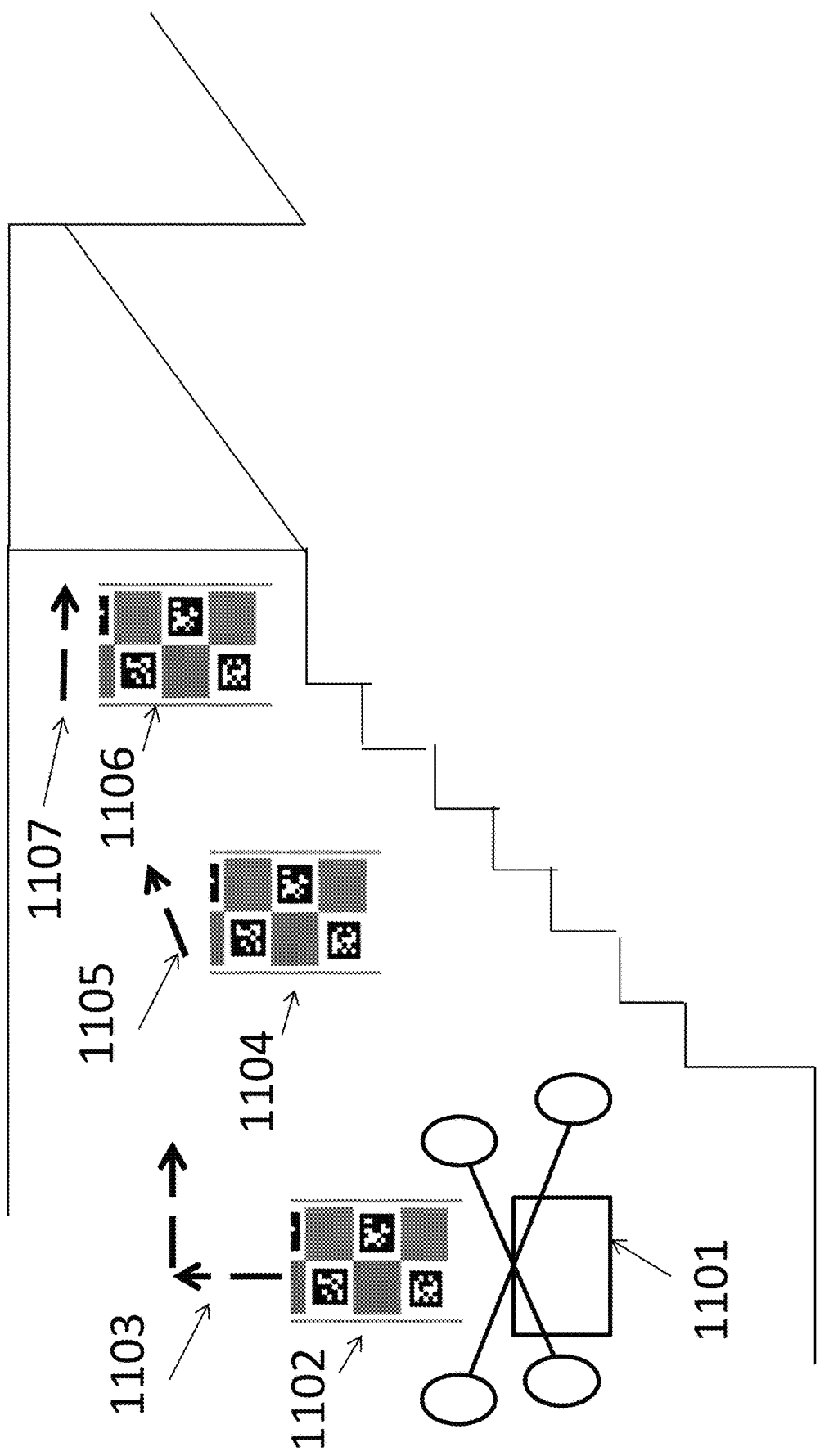
FIG. 11 shows a UAV responding to position instructions from a plurality of visual markers.

The distinction pattern can instruct the UAV to perform a mission or to perform a navigation response. A mission or navigation response may be travelling along a path from one place to another, moving a sensor, changing an attitude of the UAV, flying in a specified or particular direction, flying up or down stairs, adjusting the position of a payload, flying in accordance with preset flight commands, turning a sensor on or off, directing a sensor in a specified direction, or capturing an object. An instruction can include a specified time interval that a UAV should wait before performing the mission or navigation response. An instruction can include a predetermined distance from the visual marker that a UAV should be before performing the mission or navigation response. A distinction pattern can instruct a UAV to follow a ribbon of visual markers along a path or a series of discrete visual markers along a path. The distinction pattern can instruct the UAV to be a specified distance from the ribbon while it follows the ribbon or a series of discrete visual markers along a path. The path can be in an indoor, outdoor, or both indoor and outdoor environment. FIG. 10 shows an example of a ribbon of visual markers 1001 that can be followed by a UAV 1002. The ribbon of visual markers 1001 can be adhered on a surface such that the UAV 1002 can follow the ribbon 1001 without colliding with or encountering an obstacle. The UAV can be configured to remain at a fixed distance from the visual marker while following the marker. In an example, the fixed distance can be at least 1 cm, 5 cm, 10 cm, 20 cm, 30 cm, 40 cm, 50 cm, 60 cm, 70 cm, 80 cm, 90 cm, or 100 cm. The UAV may remain at a fixed orientation with respect to the visual marker while following the visual marker. For instance, the UAV may remain at a height that is level with the visual marker (e.g., about 90 degrees). Alternatively, the UAV may fly beneath the visual marker or above the visual marker by a predetermined number of degrees or within a predetermined range of degrees (e.g., within 30-60 degrees). The UAV can continuously determine its position by analyzing images of the visual marker 1001 as it follows the marker to detect and avoid obstacles that are detected by vision sensors or known from a map of the environment. In the case shown in FIG. 10 the ribbon of visual markers 1001 can lead the UAV 1002 up a staircase. In another case, the distinction pattern can instruct the UAV to follow a path by instructing the UAV to move a specified direction and distance. The distinction pattern can instruct the UAV to move at an angle in three dimensional space. The distinction pattern can instruct the UAV to move a specified distance. The UAV can calculate the distance traveled by analysis of a speed and time sensors that may be on board or off board the UAV. FIG. 11 shows an example in which the one or more visual markers including a distinction pattern instruction a UAV to move along a path by providing the UAV with instructions to move discrete directions and distances. In FIG. 11 a UAV 1101 may detect a first visual marker with a distinction pattern 1102. The distinction pattern 1102 can instruct the UAV to move upward and to the right a specified distance 1103. The next visual marker with a distinction pattern 1104 detected by the UAV can instruct the UAV 1101 to move upward at an angle of 30° 1105. The next visual marker with a distinction pattern 1106 detected by the UAV can instruct the UAV 1101 to move horizontally a specified distance 1107.

Figure 12:
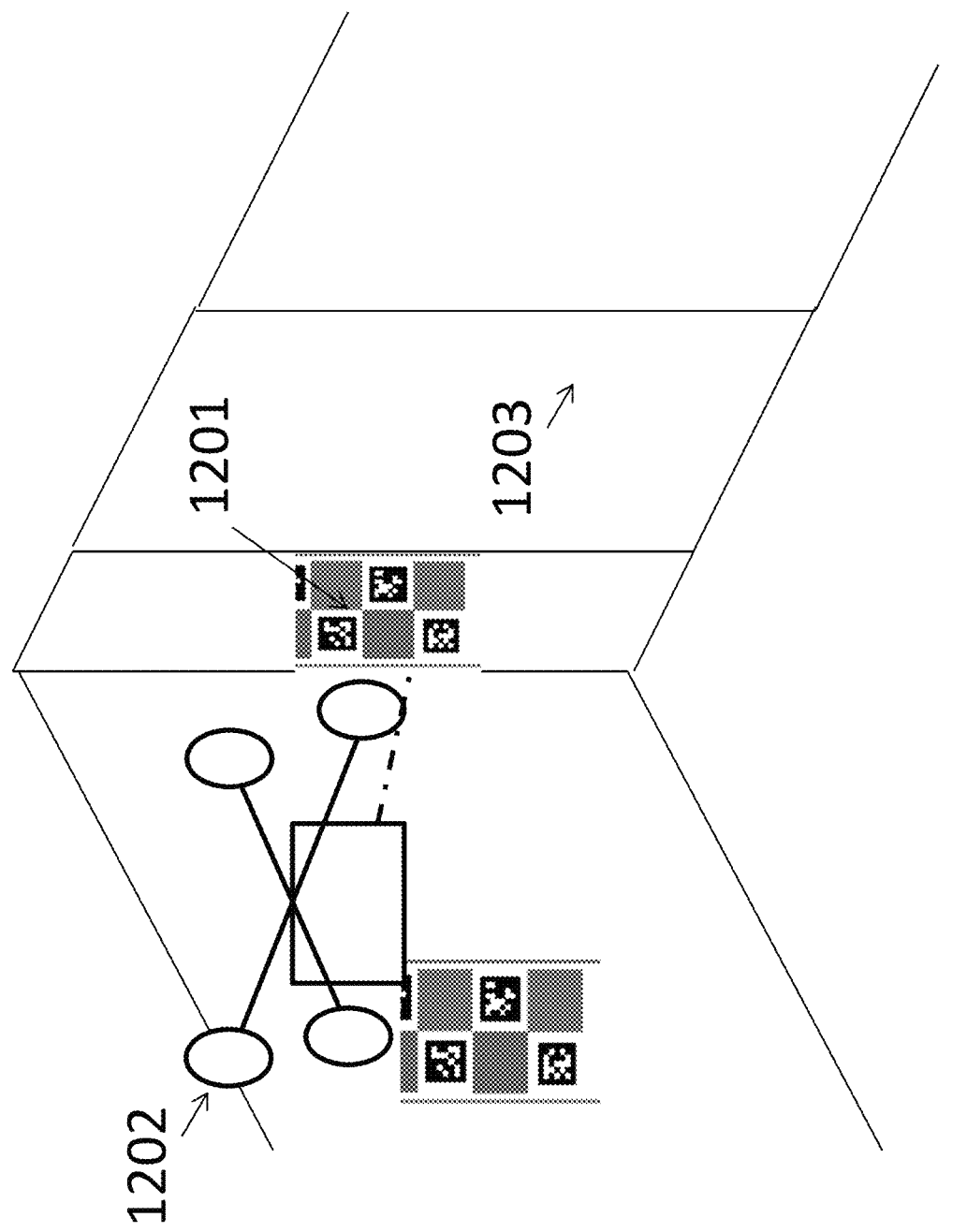
FIG. 12 shows a UAV interpreting an environment from information encoded on visual markers.

In another example, the distinction pattern can inform a UAV about the layout of an environment. The distinction pattern can inform the UAV that a feature is present in an environment. A feature can be an opening, a doorway, a corner, an obstacle, an incline, a decline, or an object. In an example shown in FIG. 12 a visual marker with a distinction pattern 1201 can inform a UAV 1202 that an environment has a feature such as a doorway opening 1203.

Figure 13:
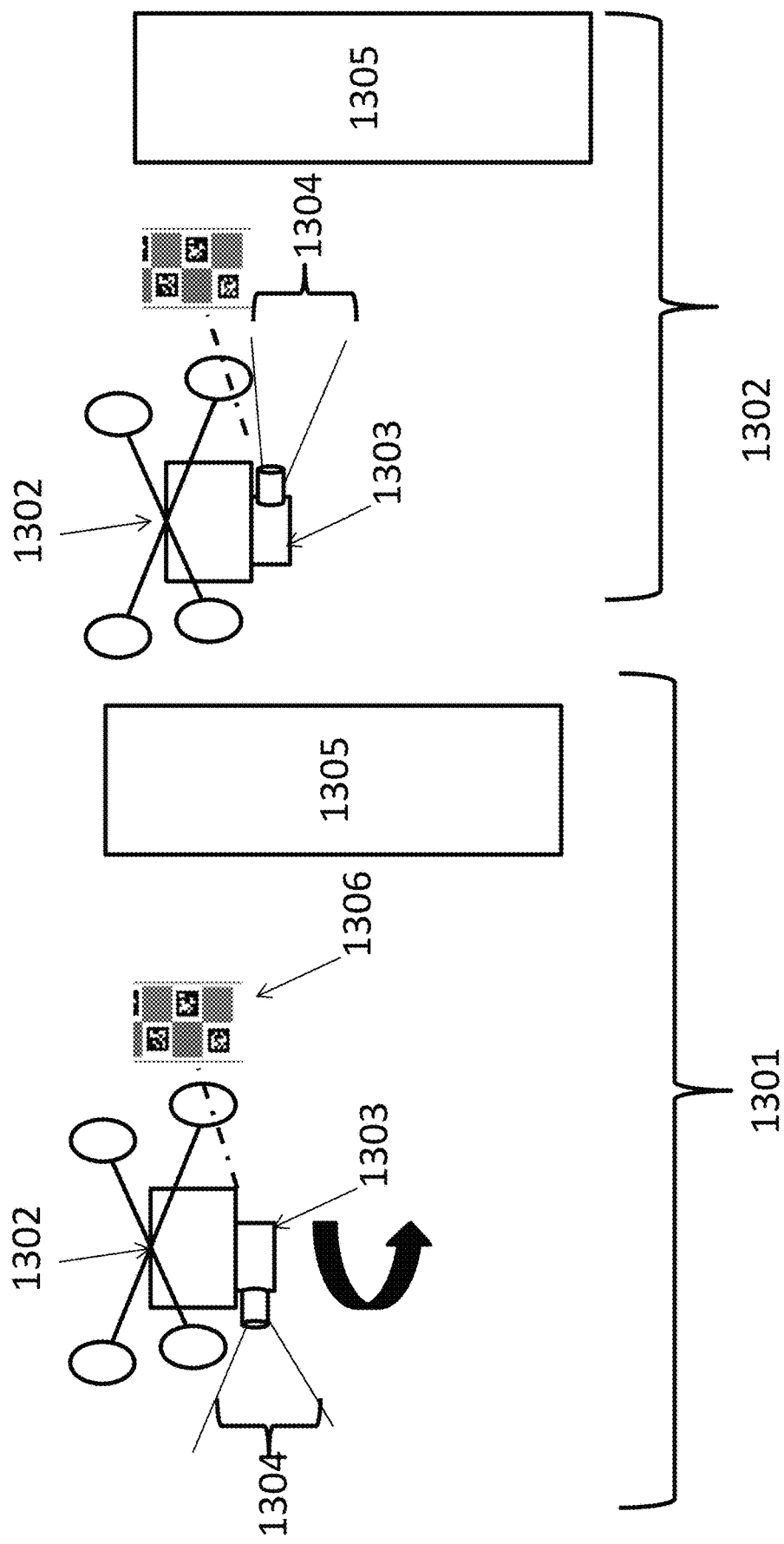
FIG. 13 shows a UAV adjusting the position of a payload in response to an instruction encoded by a visual marker.

The distinction pattern can instruct a UAV to perform a surveillance task. A surveillance task can involve moving a sensor to capture data about a subject of interest. In an example shown in FIG. 13 in a first position 1301 a UAV 1302 can have a sensor for collecting surveillance data in an environment, for example, a camera configured to collect surveillance data in an environment 1303 with a field of view 1304 directed away from a subject of interest 1305. The UAV 1302 can detect a visual marker with a distinction pattern 1306 with a first vision sensor configured to detect visual markers. The distinction pattern 1306 can instruct the UAV 1302 to move or rotate the camera 1303 into a second position 1302 such that the camera's field of view 1304 contains the subject of interest 1305. The distinction pattern can further instruct the UAV to perform a specific surveillance mission on the subject of interest 1305. The surveillance mission can include collecting data about the subject of interest 1305 from one or more sensors and storing or transmitting the data to an off board computer system.

A UAV may be used for surveillance of an environment. For instance, the UAV may be patrolling the environment. The UAV may collect information about the environment using one or more sensors when performing surveillance of the environment. The UAV may follow a predetermined or regular path for patrolling an environment. Alternatively, the UAV may follow a random flight path. The UAV may detect and/or follow a subject of interest, such as a person, animal, or vehicle. The UAV may respond to one or more detected event within the environment and investigate further.

As previously discussed, a UAV may patrol an environment by collecting one or more images within the environment. The UAV may send the collected images to an external device. The images may be sent off-board the UAV. In some instances, the images may be stored in one or more memory units off-board the UAV. The images may be displayed on a display device remote to the UAV. For example, a security monitor may show images streamed from the UAV. Human viewers may view live-feeds from the UAVs patrolling the area.

In some embodiments the environment may be an indoor environment. The indoor environment may include the interior of a building or cluster of buildings. The indoor environment may include a multi-floor building. The UAV may traverse the multi-floor building by going up and down one or stairs, or flying straight up or down a stairwell. The UAV may also be able to traverse a multi-floor building by using an elevator or flying up or down an elevator shaft. The UAV may also be able to traverse a multi-floor building by exiting a window on one floor and entering through a window on another floor. Some examples of indoor buildings may include homes, office buildings, shopping malls, hospitals, schools, or any other type of building. The UAV may be used to patrol the environment.

The visual markers, as described herein, may assist the UAV with patrolling the environment. The visual markers may orient the UAV within the environment. The UAV may be able to determine a UAV position relative to the portions of the environment. For example, the UAV may be able to determine which floor the UAV is on. The UAV may also be able to tell which room or hallway it is in. The UAV may be able to determine its orientation (e.g., relative to cardinal directions or other types of directions). The UAV may be able to determine its position relative to other rooms or hallways of the environment. The UAV may be able to determine its local or global coordinates. The UAV may be able to determine its coordinates to a level of accuracy of within about 50 m, 30 m, 20 m, 15 m, 10 m, 7 m, 5 m, 3 m, 2 m, 1.5 m, 1 m, 50 cm, 30 cm, 10 cm, 5 cm, or 1 cm.

The visual markers may optionally provide instructions to the UAV for navigation within the environment. For example, visual markers may be distributed within an environment. A plurality of visual markers may be distributed throughout the environment. The visual markers may or may not be positioned so that they are within a line-of-sight of one another. During a patrol, a UAV may encounter a first visual marker. The UAV may identify and respond to instructions that are displayed using the visual markers. The instructions may be encoded into the visual pattern of the visual markers, as described elsewhere herein. The first visual marker may direct the UAV to fly in a certain manner that will take the UAV to a second visual marker. When the UAV reaches the second visual marker, the UAV may identify and respond to instructions in the second visual marker. The second visual marker may direct the UAV to fly in a certain manner that will take the UAV to a third visual marker, and so forth. This may provide point to point navigation for a UAV. In some instances, the point to point navigation may lead the UAV in a loop within the environment to regularly patrol the environment. In some instances, point to point navigation may permit a UAV to determine its location relative to the visual markers. The UAV may determine its relative location to the markers without having to determine its global position (e.g., global coordinates). The UAV may be able to patrol a region without calculating or determining its global position.

In some instances, the visual marker may change, or the flight instructions associated with the visual markers may change. For instance, the visual marker may be displayed on a screen that may dynamically change the visual marker. In another instance, the visual marker may be static, but new flight instructions associated with the visual marker may be associated with the visual marker. The new flight instructions may be downloaded to the UAV. In some instances, the UAV may have multiple sets of flight instructions associated with a particular visual marker, and may select the associated flight instruction in accordance with other parameters. For instance, the UAV may select a set of flight instructions from multiple flight instructions associated with the visual marker randomly, based on a time indicated by the clock of the UAV (e.g., if the time is between 3 pm and 6 pm, the UAV will follow a first set of instructions and between 6 pm and midnight will follow a second set of instructions), based on sensed environmental conditions (e.g., based on the temperature, amount of light, detected motion, detected sounds), or any other factors. The different set of flight paths may direct the UAV to arrive at the same visual marker or different visual markers. For instance, in a first scenario, the UAV may be directed from a first visual marker to a second visual marker via a first flight path. In a second scenario, the UAV may be directed from the first visual marker to a second visual marker via a second flight path. Alternatively, in the second scenario, the UAV may be directed from the first visual marker to a third visual marker. This may permit a UAV to follow a different flight path in accordance with different flight instructions. This may provide some changes or unpredictability to the UAV patrol path which may provide increased effectiveness of patrol in some instances. This may also permit the UAV patrol path to change in a manner that may accommodate different detected scenarios.

Using visual markers for point to point navigation may permit the UAV to perform surveillance or a patrol in a manner that does not require input from a remote user. The UAV may be able to fly navigate the environment using the visual markers without receiving any signal from an external device (e.g., remote controllers, satellite, towers, routers). Sensors on-board the UAV, such as vision sensors, may detect sufficient information to permit the UAV to navigate.

As previously discussed, various types of instructions may be visually encoded into the visual markers. Flight instructions may be encoded into or associated with the visual markers. Other instructions, such as instructions about operation or movement of sensors, instructions to charge the UAV, or instructions about data to transmit may be included. Examples of instructions regarding sensors may include instructions for operating a carrier that may cause a sensor to move. The visual markers may cause a UAV to re-orient a sensor, such as a camera, about one, two, three or more axes. The visual markers may control the sensor directly (e.g., turning the sensor on, off, zooming, changing sensor modes). This may aid in the UAV security patrol and permit the UAV to perform data collection using one or more sensors without requiring instructions from an outside source or device. The sensor instructions or other instructions may be provided separately or in combination with flight instructions from a single visual marker.

A UAV may be able to patrol an environment autonomously or semi-autonomously with aid of the visual markers. The UAV may be able to patrol the environment autonomously without requiring human intervention. The visual markers may aid the UAV in navigating the environment without requiring input from a human operator. The UAV may determine how to fly without requiring a human to manually direct the UAV's flight. The visual marker may permit the UAV to orient itself without the use of GPS or other location sensors that require external communication. The UAV may be able to orient itself within an environment without requiring any communications with an external device. The UAV may be able to fly within the environment without requiring communications with an external device. The UAV may be able to conduct surveillance of the environment without requiring communications with an external device.

In some embodiments, a human operator may or may not communicate with the UAV via a remote controller. In some embodiments, the UAV may operate autonomously without receiving any input from a human via a remote controller. In some instances, the human may be able to intervene using a remote controller. For instance, if the human witnesses an event through a live feed captured by the UAV, the human may be able to intervene using the remote controller. In the absence of human intervention, the UAV may be capable of continuing on its patrol without input from the human operator.

The systems, devices, and methods described herein can be applied to a wide variety of movable objects. As previously mentioned, any description herein of an aerial vehicle, such as a UAV, may apply to and be used for any movable object. Any description herein of an aerial vehicle may apply specifically to UAVs. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$3, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 14:
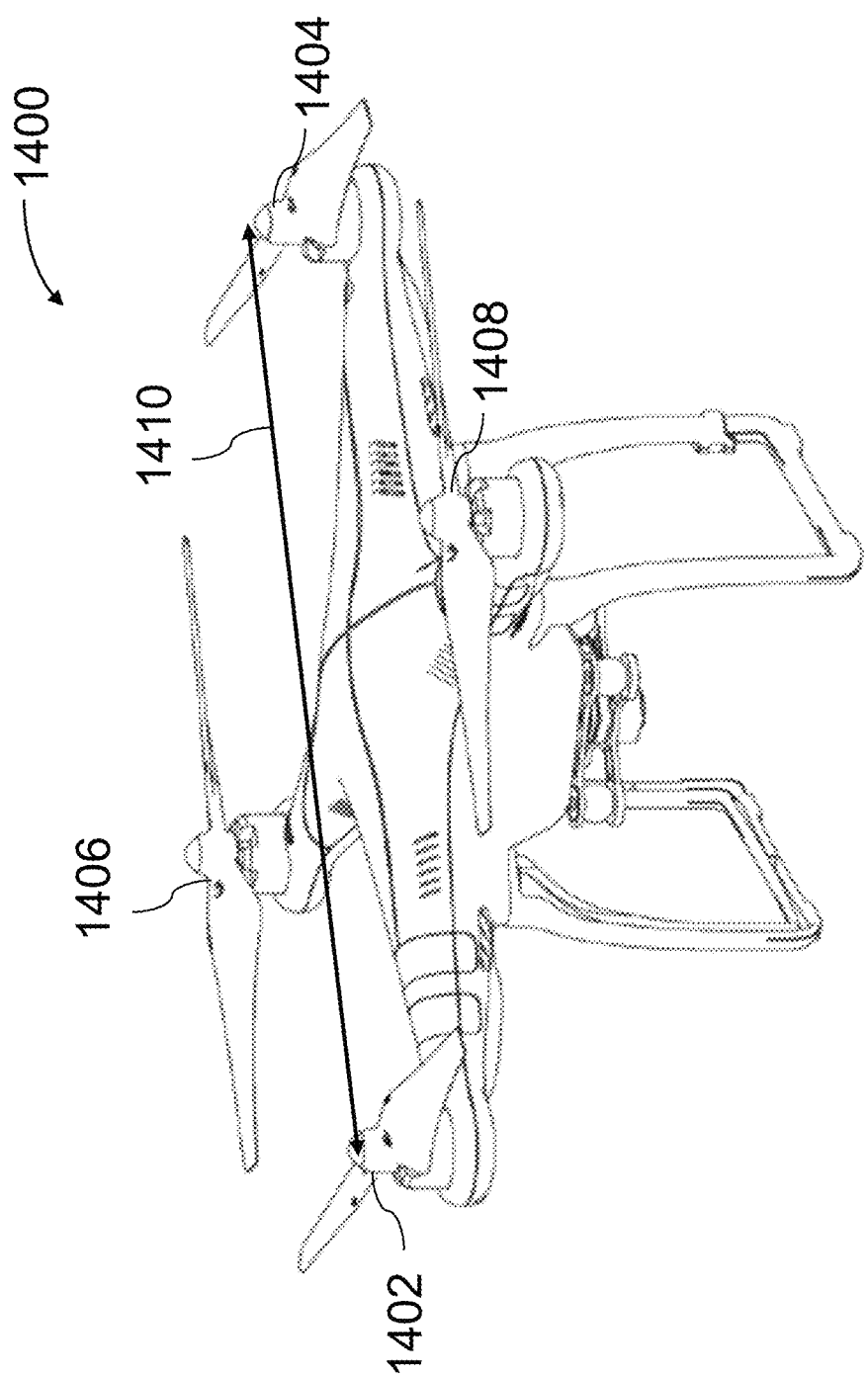
FIG. 14 illustrates an unmanned aerial vehicle, in accordance with an embodiment of the disclosure.

FIG. 14 illustrates an unmanned aerial vehicle (UAV) 1400, in accordance with embodiments of the present disclosure. The UAV may be an example of a movable object as described herein. The UAV 1400 can include a propulsion system having four rotors 1402, 1404, 1406, and 1408. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1410. For example, the length 1410 can be less than or equal to 2 m, or less than equal to 5 m. In some embodiments, the length 1410 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 15:
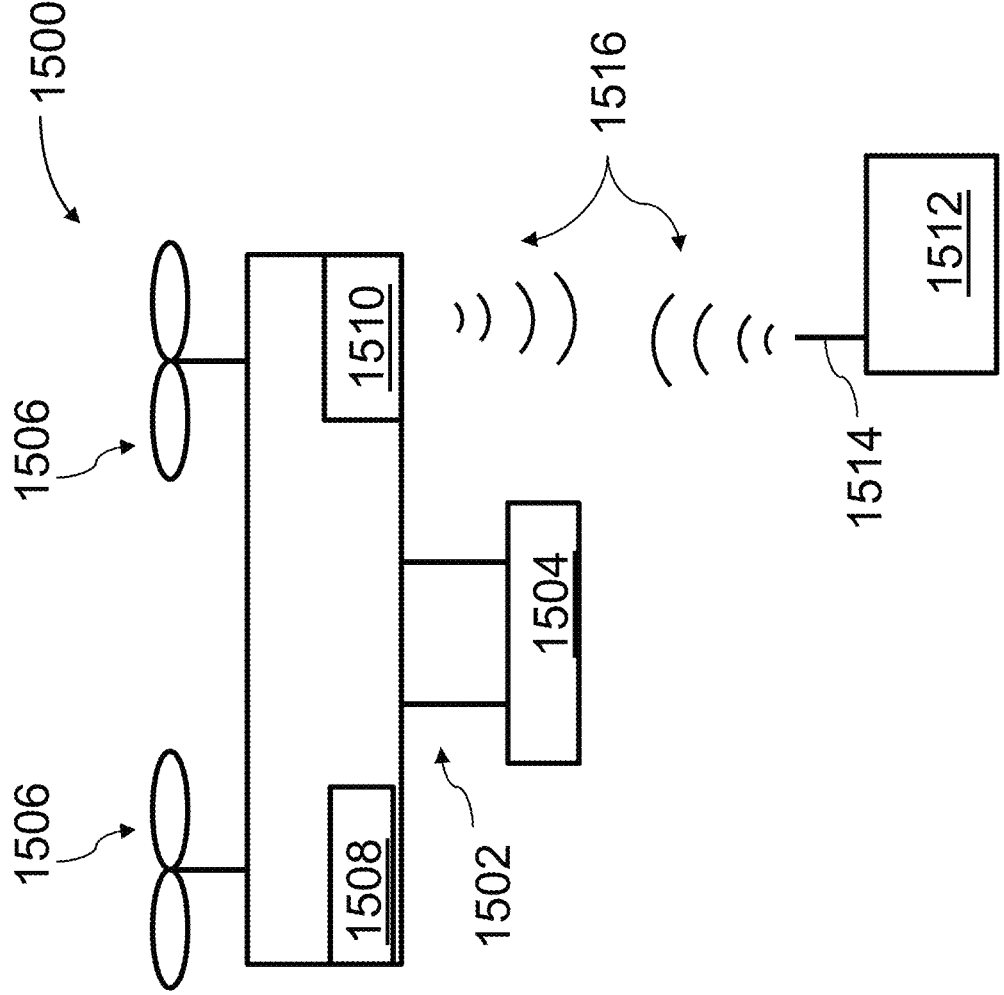
FIG. 15 illustrates a movable object including a carrier and a payload, in accordance with an embodiment of the disclosure.

FIG. 15 illustrates a movable object 1500 including a carrier 1502 and a payload 1504, in accordance with embodiments. Although the movable object 1500 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1504 may be provided on the movable object 1500 without requiring the carrier 1502. The movable object 1500 may include propulsion mechanisms 1506, a sensing system 1508, and a communication system 1510.

The propulsion mechanisms 1506 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1506 can be mounted on the movable object 1500 using any suitable means, such as a support element (e.g., a drive shaft) as described elsewhere herein. The propulsion mechanisms 1506 can be mounted on any suitable portion of the movable object 1500, such on the top, bottom, front, back, sides, or suitable combinations thereof.

In some embodiments, the propulsion mechanisms 1506 can enable the movable object 1500 to take off vertically from a surface or land vertically on a surface without requiring any horizontal movement of the movable object 1500 (e.g., without traveling down a runway). Optionally, the propulsion mechanisms 1506 can be operable to permit the movable object 1500 to hover in the air at a specified position and/or orientation. One or more of the propulsion mechanisms 1500 may be controlled independently of the other propulsion mechanisms. Alternatively, the propulsion mechanisms 1500 can be configured to be controlled simultaneously. For example, the movable object 1500 can have multiple horizontally oriented rotors that can provide lift and/or thrust to the movable object. The multiple horizontally oriented rotors can be actuated to provide vertical takeoff, vertical landing, and hovering capabilities to the movable object 1400. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1500 (e.g., with respect to up to three degrees of translation and up to three degrees of rotation).

The sensing system 1508 can include one or more sensors that may sense the spatial disposition, velocity, and/or acceleration of the movable object 1500 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1508 can be used to control the spatial disposition, velocity, and/or orientation of the movable object 1500 (e.g., using a suitable processing unit and/or control module, as described below). Alternatively, the sensing system 1508 can be used to provide data regarding the environment surrounding the movable object, such as weather conditions, proximity to potential obstacles, location of geographical features, location of manmade structures, and the like.

The communication system 1510 enables communication with terminal 1512 having a communication system 1514 via wireless signals 1516. The communication systems 1510, 1514 may include any number of transmitters, receivers, and/or transceivers suitable for wireless communication. The communication may be one-way communication, such that data can be transmitted in only one direction. For example, one-way communication may involve only the movable object 1500 transmitting data to the terminal 1512, or vice-versa. The data may be transmitted from one or more transmitters of the communication system 1510 to one or more receivers of the communication system 1512, or vice-versa. Alternatively, the communication may be two-way communication, such that data can be transmitted in both directions between the movable object 1500 and the terminal 1512. The two-way communication can involve transmitting data from one or more transmitters of the communication system 1510 to one or more receivers of the communication system 1514, and vice-versa.

In some embodiments, the terminal 1512 can provide control data to one or more of the movable object 1500, carrier 1502, and payload 1504 and receive information from one or more of the movable object 1500, carrier 1502, and payload 1504 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1506), or a movement of the payload with respect to the movable object (e.g., via control of the carrier 1502). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1508 or of the payload 1504). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1512 can be configured to control a state of one or more of the movable object 1500, carrier 1502, or payload 1504. Alternatively or in combination, the carrier 1502 and payload 1504 can also each include a communication module configured to communicate with terminal 1512, such that the terminal can communicate with and control each of the movable object 1500, carrier 1502, and payload 1504 independently.

In some embodiments, the movable object 1500 can be configured to communicate with another remote device in addition to the terminal 1512, or instead of the terminal 1512. The terminal 1512 may also be configured to communicate with another remote device as well as the movable object 1500. For example, the movable object 1500 and/or terminal 1512 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1500, receive data from the movable object 1500, transmit data to the terminal 1512, and/or receive data from the terminal 1512. Optionally, the remote device can be connected to the Internet or other telecommunications network, such that data received from the movable object 1500 and/or terminal 1512 can be uploaded to a website or server.

Figure 16:
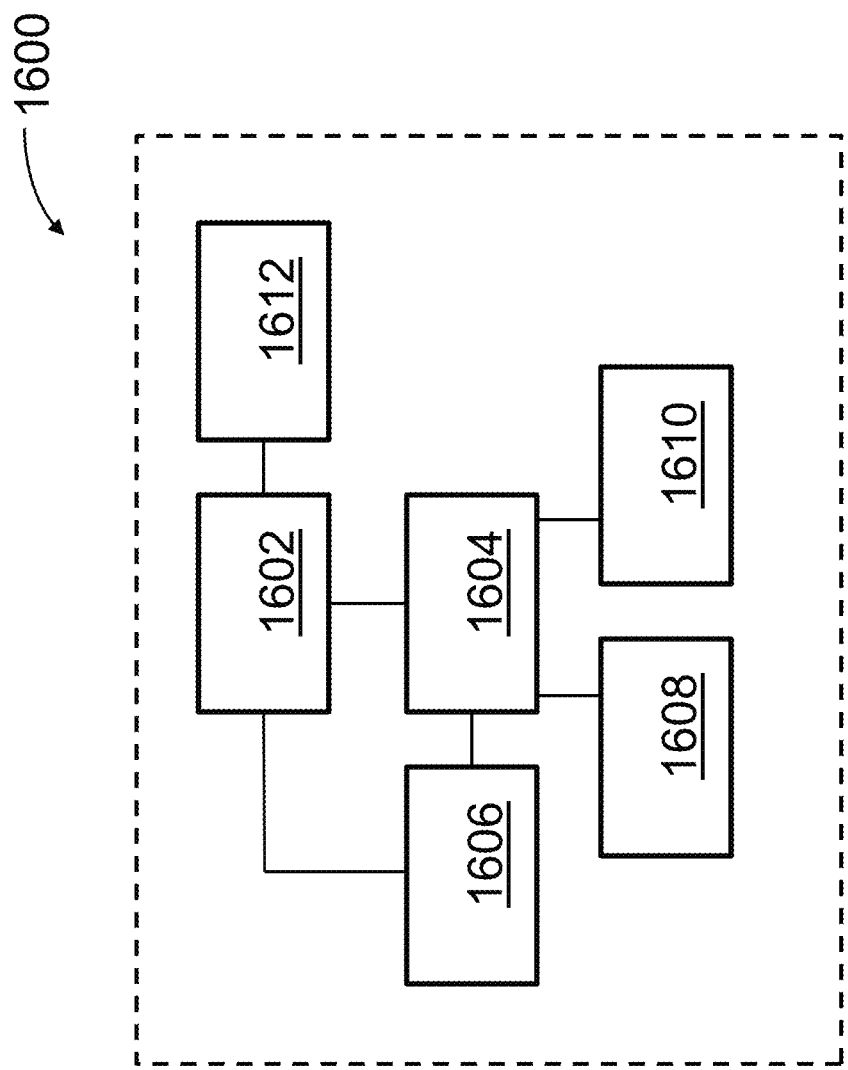
FIG. 16 is a schematic illustration by way of block diagram of a system for controlling a movable object, in accordance with an embodiment of the disclosure.

FIG. 16 is a schematic illustration by way of block diagram of a system 1600 for controlling a movable object, in accordance with embodiments. The system 1600 can be used in combination with any suitable embodiment of the systems, devices, and methods disclosed herein. The system 1600 can include a sensing module 1602, processing unit 1604, non-transitory computer readable medium 1606, control module 1608, and communication module 1610.

The sensing module 1602 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1602 can be operatively coupled to a processing unit 1604 having a plurality of processors. In some embodiments, the sensing module can be operatively coupled to a transmission module 1612 (e.g., a Wi-Fi image transmission module) configured to directly transmit sensing data to a suitable external device or system. For example, the transmission module 1612 can be used to transmit images captured by a camera of the sensing module 1602 to a remote terminal.

The processing unit 1604 can have one or more processors, such as a programmable processor (e.g., a central processing unit (CPU)). The processing unit 1604 can be operatively coupled to a non-transitory computer readable medium 1606. The non-transitory computer readable medium 1606 can store logic, code, and/or program instructions executable by the processing unit 1604 for performing one or more steps. The non-transitory computer readable medium can include one or more memory units (e.g., removable media or external storage such as an SD card or random access memory (RAM)). In some embodiments, data from the sensing module 1602 can be directly conveyed to and stored within the memory units of the non-transitory computer readable medium 1606. The memory units of the non-transitory computer readable medium 1606 can store logic, code and/or program instructions executable by the processing unit 1604 to perform any suitable embodiment of the methods described herein. For example, the processing unit 1604 can be configured to execute instructions causing one or more processors of the processing unit 1604 to analyze sensing data produced by the sensing module. The memory units can store sensing data from the sensing module to be processed by the processing unit 1604. In some embodiments, the memory units of the non-transitory computer readable medium 1606 can be used to store the processing results produced by the processing unit 1604.

In some embodiments, the processing unit 1604 can be operatively coupled to a control module 1608 configured to control a state of the movable object. For example, the control module 1608 can be configured to control the propulsion mechanisms of the movable object to adjust the spatial disposition, velocity, and/or acceleration of the movable object with respect to six degrees of freedom. Alternatively or in combination, the control module 1608 can control one or more of a state of a carrier, payload, or sensing module.

The processing unit 1604 can be operatively coupled to a communication module 1510 configured to transmit and/or receive data from one or more external devices (e.g., a terminal, display device, or other remote controller). Any suitable means of communication can be used, such as wired communication or wireless communication. For example, the communication module 1610 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1610 can transmit and/or receive one or more of sensing data from the sensing module 1602, processing results produced by the processing unit 1604, predetermined control data, user commands from a terminal or remote controller, and the like.

The components of the system 1600 can be arranged in any suitable configuration. For example, one or more of the components of the system 1600 can be located on the movable object, carrier, payload, terminal, sensing system, or an additional external device in communication with one or more of the above. Additionally, although FIG. 16 depicts a single processing unit 1604 and a single non-transitory computer readable medium 1606, one of skill in the art would appreciate that this is not intended to be limiting, and that the system 1600 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1600 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A method of controlling an unmanned aerial vehicle (UAV) comprising:
   receiving, from one or more vision sensors of the UAV, an image including a marker within an environment, the image being captured while the UAV is in flight, and the marker having a visual pattern;
   identifying, with aid of one or more processors, the visual pattern to determine a plurality of instructions encoded in the visual pattern, the plurality of instructions including at least one of adjusting position of a payload or swapping the payload; and
   controlling, in response to the plurality of instructions, the UAV to perform an action including at least one of adjusting the position of the payload or swapping the payload.

2. The method of claim 1, wherein the environment is an indoor environment or an environment in which global position system (GPS) signals are not reliable.

3. The method of claim 1, wherein the marker includes a ribbon.

4. The method of claim 1, wherein the visual pattern includes squares of different colors.

5. The method of claim 1, wherein the visual pattern includes at least one of AprilTags, QR codes, or bar codes.

6. The method of claim 1, wherein the action is independent of flight of the UAV.

7. The method of claim 1, wherein controlling the UAV to perform the action includes controlling the UAV to perform the action within at least one of a predetermined amount of time or a predetermined distance after the visual pattern is identified.

8. The method of claim 1, further comprising:
   calculating a dimension of at least a portion of the visual pattern; and
   determining, with aid of the one or more processors, a location of the UAV within a three-dimensional coordinate system, based on the dimension of the at least a portion of the visual pattern.

9. The method of claim 1, further comprising:
   positioning the UAV within the environment by calculating a rotation and a position of the UAV relative to the marker using at least one of intrinsic properties of the one or more vision sensors, a predefined position of the marker, or a set of points in the image.

10. The method of claim 9, wherein the UAV is patrolling the environment autonomously while the one or more vision sensors capture the image.

11. A system for controlling an unmanned aerial vehicle (UAV) comprising:
    one or more vision sensors configured to capture an image including a marker within an environment, the image being captured while the UAV is flight, and the marker having a visual pattern; and
    one or more processors, individually or collectively configured to:
    identify the visual pattern to determine a plurality of instructions encoded in the visual pattern, the plurality of instructions including at least one of adjusting position of a payload or swapping the payload; and control, in response to the plurality of instructions, the UAV to perform an action including at least one of adjusting the position of the payload or swapping the payload.

12. The system of claim 11, wherein the environment is an indoor environment or an environment in which global position system (GPS) signals are not reliable.

13. The system of claim 11, wherein the marker includes a ribbon.

14. The system of claim 11, wherein the visual pattern includes squares of different colors.

15. The system of claim 11, wherein the visual pattern includes at least one of AprilTags, QR codes, or bar codes.

16. The system of claim 11, wherein the action is independent of flight of the UAV.

17. The system of claim 11, wherein the one or more processors are further configured to control the UAV to perform the action within at least one of a predetermined amount of time or a predetermined distance after the visual pattern is identified.

18. The system of claim 11, wherein the one or more processors are further configured to:
calculate a dimension of at least a portion of the visual pattern; and
determine a location of the UAV within a three-dimensional coordinate system, based on the dimension of the at least a portion of the visual pattern.

19. The system of claim 11, wherein the one or more processors are further configured to:
position the UAV within the environment by calculating a rotation and a position of the UAV relative to the marker using at least one of intrinsic properties of the one or more vision sensors, a predefined position of the marker, or a set of points in the image.

20. The system of claim 19, wherein the UAV is configured to patrol the environment autonomously while the one or more vision sensors capture the image.

* * * * *